United States Patent [19]
Morisawa et al.

[11] Patent Number: 5,881,214
[45] Date of Patent: Mar. 9, 1999

[54] IMAGE SEARCHING APPARATUS

[75] Inventors: Akira Morisawa, Ichikawa; Kamon Hasuo, Kawasaki; Kazuo Ohtani, Kodaira; Ryuichi Masuda, Funabashi; Hirokazu Higuchi, Fujisawa; Takeshi Nakamura, Tama, all of Japan

[73] Assignee: Canon Kabushiki Kaisha, Tokyo, Japan

[21] Appl. No.: 61,739

[22] Filed: May 17, 1993

[30] Foreign Application Priority Data

May 19, 1992 [JP] Japan ................................. 4-151610
May 19, 1992 [JP] Japan ................................. 4-151611

[51] Int. Cl.⁶ .................................................. G06F 15/00
[52] U.S. Cl. ......................................... 395/117; 395/115
[58] Field of Search .................................. 395/115, 145, 395/164, 165, 166, 600, 155, 156, 157, 159, 615; 358/403, 468, 296, 407; 235/375, 376; 345/115, 123

[56] References Cited

U.S. PATENT DOCUMENTS

| | | | |
|---|---|---|---|
| 4,808,987 | 2/1989 | Takeda et al. ........................ | 345/115 |
| 5,027,230 | 6/1991 | Nakayama ............................ | 360/35.1 |
| 5,099,340 | 3/1992 | Kamada et al. ...................... | 358/403 |
| 5,153,744 | 10/1992 | Nobuta ................................. | 358/400 |
| 5,291,592 | 3/1994 | Kita ..................................... | 395/600 |
| 5,353,397 | 10/1994 | Yokoyama et al. .................. | 395/145 |
| 5,440,401 | 8/1995 | Parulski et al. ...................... | 358/342 |
| 5,579,419 | 11/1996 | Yaguchi et al. ...................... | 382/305 |

FOREIGN PATENT DOCUMENTS 5324737  12/1993  Japan .

*Primary Examiner*—Edward L. Coles
*Assistant Examiner*—Dov Popovici
*Attorney, Agent, or Firm*—Fitzpatrick, Cella, Harper & Scinto

[57] ABSTRACT

There is disclosed an image searching apparatus capable of searching an image stored in a memory medium, corresponding to a search image, selected from the plural search images registered in advance. The apparatus can generate a synthesized image, including the registered search images, together with marking areas, to be marked by the operator for selecting the search image, and prints the synthesized as a marking sheet which is to be marked by the operator and then read by the apparatus again, whereby the apparatus effects the image search, based on the marking provided on the marking sheet.

26 Claims, 22 Drawing Sheets

IMAGE SEARCHING APPARATUS

BACKGROUND OF THE INVENTION

1. Field of the Invention

The present invention relates to an image searching apparatus for searching an image stored in a memory medium.

2. Related Background Art

Recently, there are often utilized the image filing apparatus which is designed to read the image of an original document and to store the image, for example, in the magneto-optical disk. In such image filing apparatus, an index word is given in advance to the image to be stored, and the search of the stored images is achieved by the entry of the index word by the operator through the keyboard.

In other image filing apparatus, an index image is used, instead of the index word, for image search. In such apparatus, at the reading and storage of the image of the original document, the operator sets an index image, serving as the index for the image, for example, by means of the keyboard.

However, the work of attaching such index word or index image is cumbersome for the operator, and the image storing operation has been extremely time consuming for this reason.

SUMMARY OF THE INVENTION

An object of the present invention is to provide an image searching apparatus not associated with the above-mentioned drawbacks.

Another object of the present invention is to provide an image searching apparatus capable of easy setting of the search image for image searching.

Still another object of the present invention is to provide an image reading apparatus capable of exact reading of a mark sheet.

Other objects of the present invention, and the features thereof, will become fully apparent from the following description to be taken in conjunction with the attached drawings.

DETAILED DESCRIPTION OF THE PREFERRED EMBODIMENTS

Figure 1:
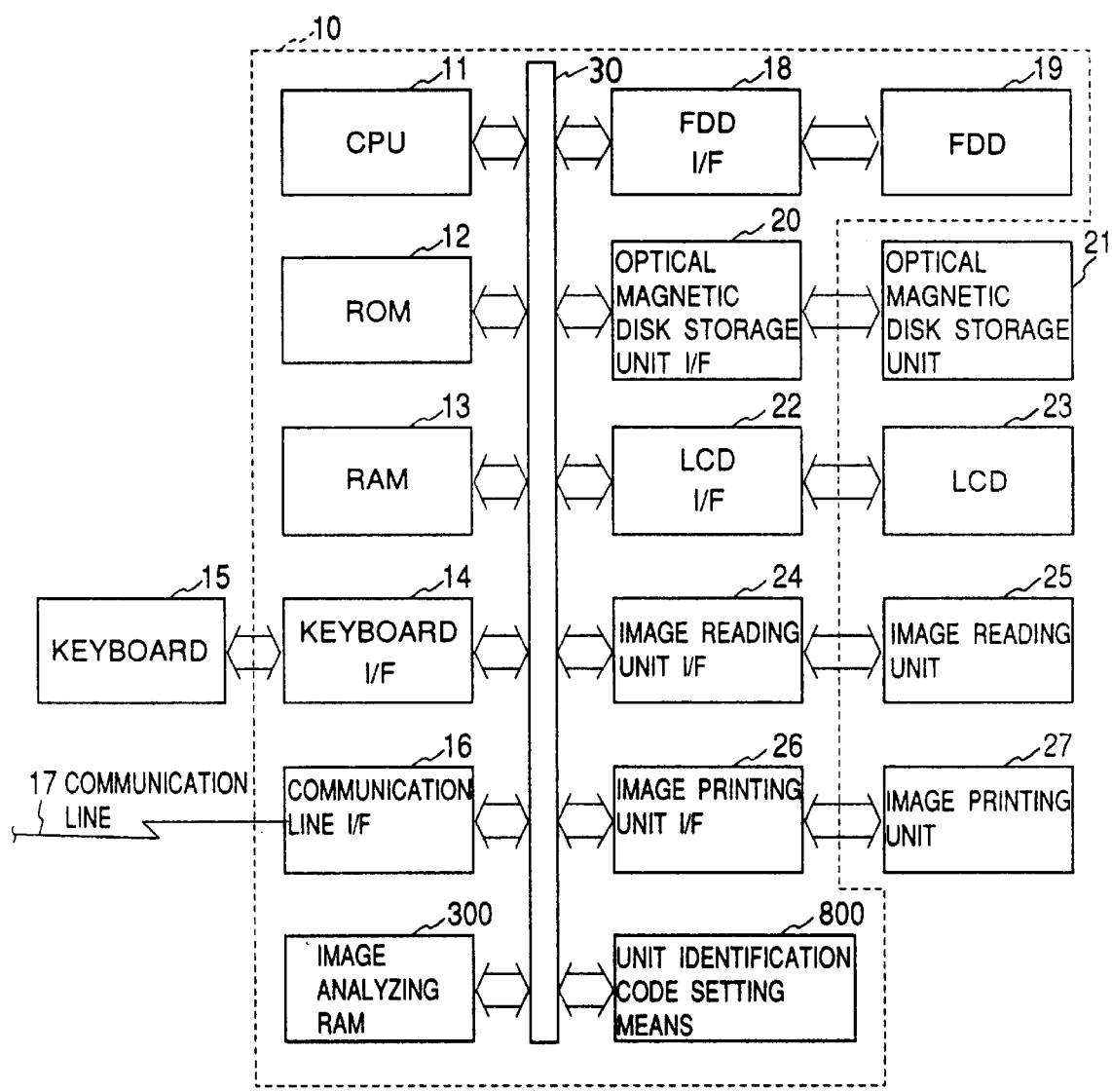
FIG. 1 is a block diagram of an embodiment of the apparatus of the present invention.

FIG. 1 is a block diagram showing the structure of an embodiment of the image information processing apparatus of the present invention.

The image information processing apparatus is provided with a central control unit 10, a keyboard 15, a magneto-optical disk memory device (optical magnetic disk storage unit) 21, a liquid crystal display 23, an image reading device (image reading unit) 25, and an image printing device (image printing unit) 27.

The central control unit 10 is provided with a CPU 11 composed of a microprocessor, a ROM 12 storing the operation program of the CPU 11, and a RAM 13 serving as a work area for the CPU 11, a loading area for the data and the programs from a floppy disk, and a loading area for the data and the programs from the magneto-optical disk memory device 21.

The central control unit 10 is further provided with a keyboard interface circuit 14 for connecting the keyboard 15 with a system bus 30; a communication line interface circuit 16 for connecting a communication line 17 with the system bus 30; a floppy disk interface circuit 18 for connecting a floppy disk device 19 with the system bus 30; a magneto-optical disk memory device interface circuit 20 for connecting the magneto-optical disk memory device 21 with the system bus 30; a liquid crystal display interface circuit 22 for connecting the liquid crystal display 23 with the system bus 30; an image reading device interface circuit 24 for connecting the image reading device 25 with the system bus 30; an image printing device interface circuit 26 for connecting the image printing device 27 with the system bus 30; an image analyzing RAM 300; and unit identification code setting means 800. The RAM 300 stores a program for mark sheet analysis.

Figure 2:
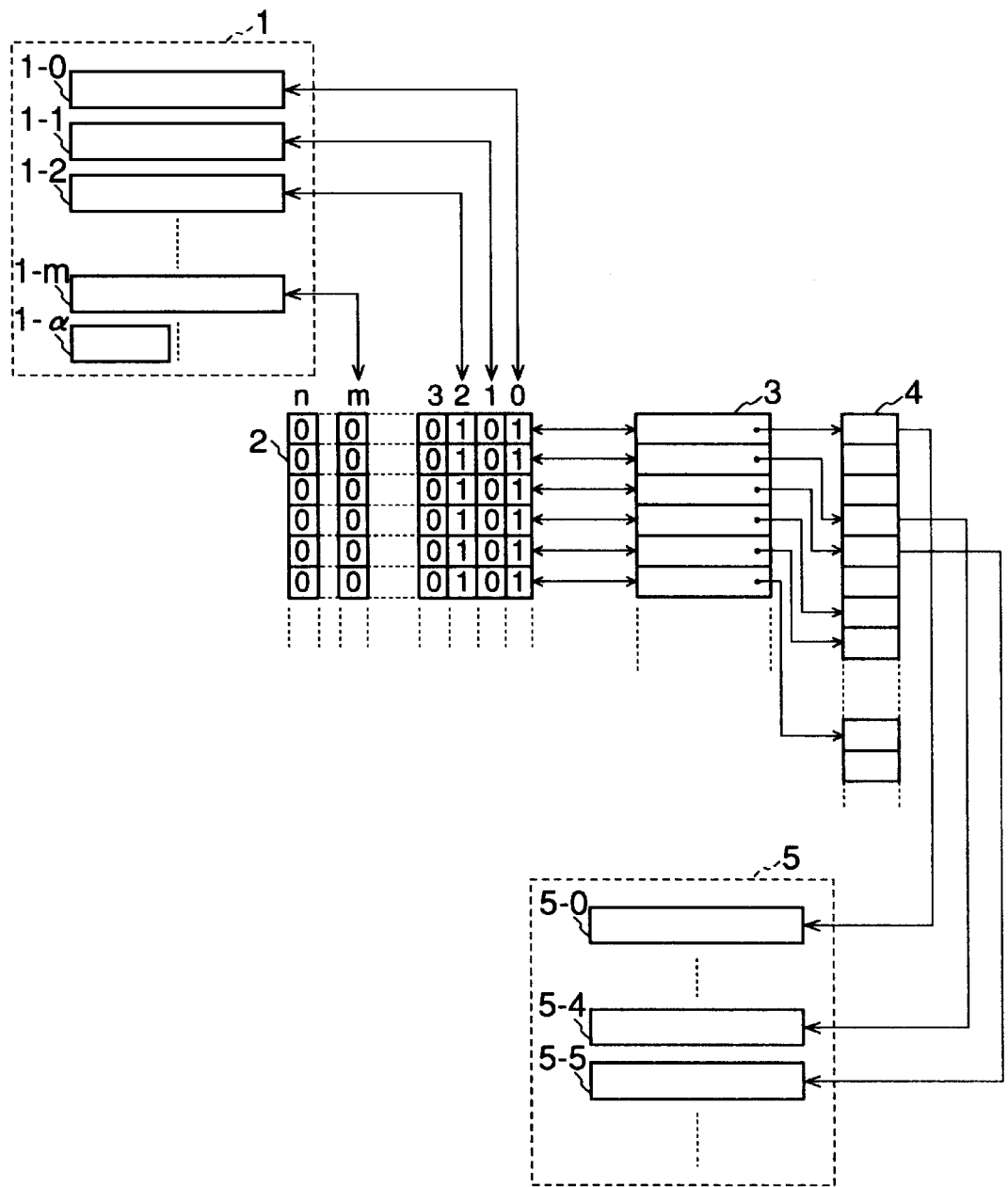
FIG. 2 is a schematic view of a memory area of the apparatus of the embodiment.

FIG. 2 shows the structure of the memory area for information search, composed of an index image data file 1 for storing individual index image data 1-0 to 1-m, a relation data file 2 for storing relation data to be explained later, a directory 3 for storing search information, a FAT (file allocation table) 4 for controlling the file arrangement in the recording medium, and an information file group 5 to be searched. The index image data file 1 is provided with an ID area 1-α.

Figure 3:
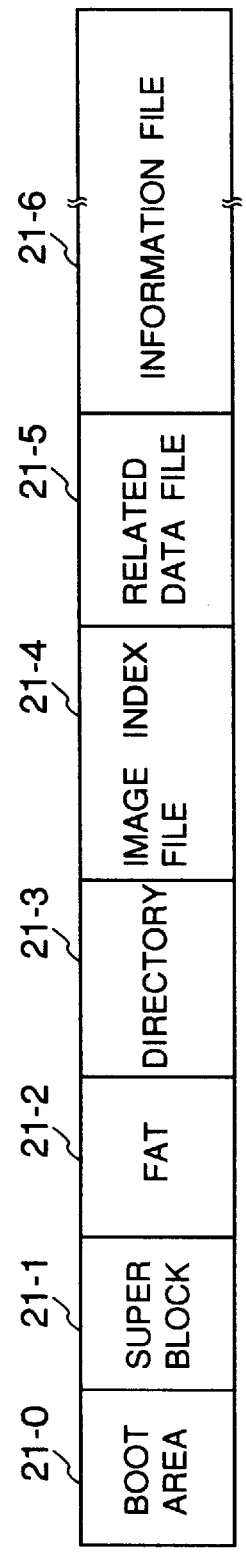
FIG. 3 is a view of the format of file data to be stored in a magneto-optical disk memory device 21.

FIG. 3 is a schematic view showing the data format in the magneto-optical disk.

As shown in FIG. 3, there are stored in succession a boot area 21-0, a super block 21-1, a FAT 21-2, a directory 21-3, an image index file 21-4, a related data file 21-5, and an information file 21-6. The super block 21-1 stores disk ID data obtained by synthesizing the unit identification code and data/time data read from an illustrated timer.

Figure 4:
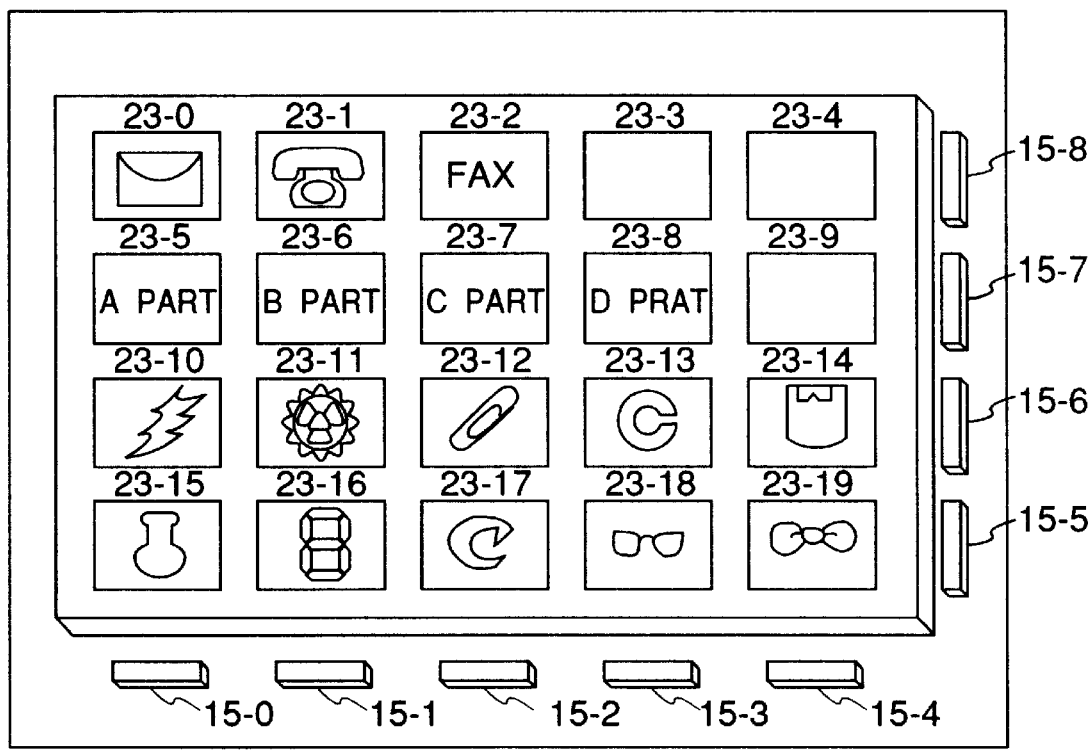
FIG. 4 is a plan view of a liquid crystal display 23 and a keyboard 15.

FIG. 4 is a plan view showing an index display area of the liquid crystal display 23 and index setting keys of the keyboard 15.

The liquid crystal display 23 is provided with index image display areas 23-0–23-19, and the keyboard 15 is provided with input keys 15-0–15-8, arranged corresponding to the rows and columns of the index image display areas.

In the following there will be explained the functions of the present embodiment in succession.

(1) Starting of the apparatus:

When the operator turns on a power switch of the apparatus, the CPU 11 effects checking of the RAM 13, initialization of the internal parameters, initialization of the interface circuits, and clearing of the liquid crystal display 23 according to a program stored in the ROM 12, and awaits the operation of the keyboard 15 by the operator.

(2) Registration, alteration, displacement and erasure of index images for image search:

At the registration of an image, the operator selects the registration of the index image for image search by the keyboard 15 and enters the position of the display area in which the index image is to be registered, by the keys 15-0–15-8 corresponding to the row and the column of the display area. The entry may also be achieved by a touch panel mounted on the liquid display panel or by the entry of a number by numeric keys. Subsequently, the operator sets an original document bearing the index image on the image reading device 25.

Upon detection of the setting of the original through the image reading device interface circuit 24, the CPU 11 initiates the reading of the original by the image reading device 25 through the interface circuit 24, and stores the image data from the image reading device 25, as index image data, in the RAM 13.

Then, the CPU 11 displays the index image data, stored in the RAM 13, on the liquid crystal display 23 through the liquid crystal display interface circuit 22, and stores the index image data in the image file 1 of the magneto-optical disk memory device 21 through the interface circuit 20.

Also, at this registration of the index image, the CPU 11 reads the unit identification code from the unit identification code setting means 800 and the data and time from the timer means (not shown), and stores the data, prepared by synthesizing the unit identification code, data and time, as the index image identification data of a set of plural index images, in the ID area 1-α of the index image data file 1 of the magneto-optical disk memory device 21 through the magneto-optical disk memory interface circuit 20.

The above-mentioned unit identification code setting means 800 is composed of dip switches or a RAM with a back-up battery, and predetermined code information is set by the operator as the unit identification code, prior to the index image reading operation.

Subsequently, necessary index images are registered in succession in a similar manner.

In the following there will be explained alteration, displacement and erasure of the registered index image.

For altering an index image, the operator instructs the alteration of an index image for image search by the keyboard 15, and enters the position of the index image to be altered, by the keys 15-0–15-8 corresponding to the row and the column of the position.

Then, an original bearing the index image is set on the image reading device 25.

Upon detection of the setting of said original through the image reading device interface circuit 24, the CPU 11 initiates the reading of the original by the image reading device 25 through the interface circuit 24, and stores the index image data in the RAM 13.

Then, the CPU 11 displays the index image data, stored in the RAM 13, on the liquid crystal display 23 through the liquid crystal display interface circuit 22, and stores the index image data in the index image data file 1 of the magneto-optical disk memory device 21 through the interface circuit 20.

Also, at said alteration of the index image, the CPU 11 reads the unit identification code from the unit identification code setting means 800 and the data and time from the timer means, and stores the index image identification data, synthesized from both data, in the ID areas 1-α of the index image data file 1 of the magneto-optical disk memory device 21 through the interface circuit 20.

In case of displacement of an index image, the operator instructs the displacement of an index image for image search by the keyboard 15, and enters the position of the index image to be moved and the position of destination of displacement, by the keys 15-0–15-8 corresponding to the row and the column of the positions.

The CPU 11 interchanges the index image to be displaced and the index image at the destination of displacement in the index image file 1, also interchanges the bits corresponding to the index image to be displaced and those corresponding to the index image of the destination in all the records of the relation data file 2, and interchanges the index image to be displaced and that at the destination, on the liquid crystal display 23.

Also, at the displacement of the index image, the CPU 11 reads the unit identification code from the unit identification code setting means 800 and the data and time from the timer means, and stores the index image identification data, synthesized from both data, in the ID area 1-α of the index image data file 1 of the magneto-optical disk memory 21 through the interface circuit 20.

In case of erasing an index image, the operator instructs the erasure of an index image for image search by the keyboard 15, and enters the position of the index image to be erased, by the keys 15-0–15-8 corresponding to the row and the column of the position.

The CPU 11 erases the index image to be erased from the index image file 1, also clears the bits corresponding to the index image to be erased, in all the records of the related data file 2, and erases the index image to be erased, from the liquid crystal display 23.

Also, at the erasure of the index image, the CPU 11 reads the unit identification code from the unit identification code setting means 800 and the date and time from the timer means, and stores the index image identification data, synthesized from both data, in the ID area 1-α of the index image data file 1 of the magneto-optical disk memory 21 through the interface circuit 20.

Figure 5:
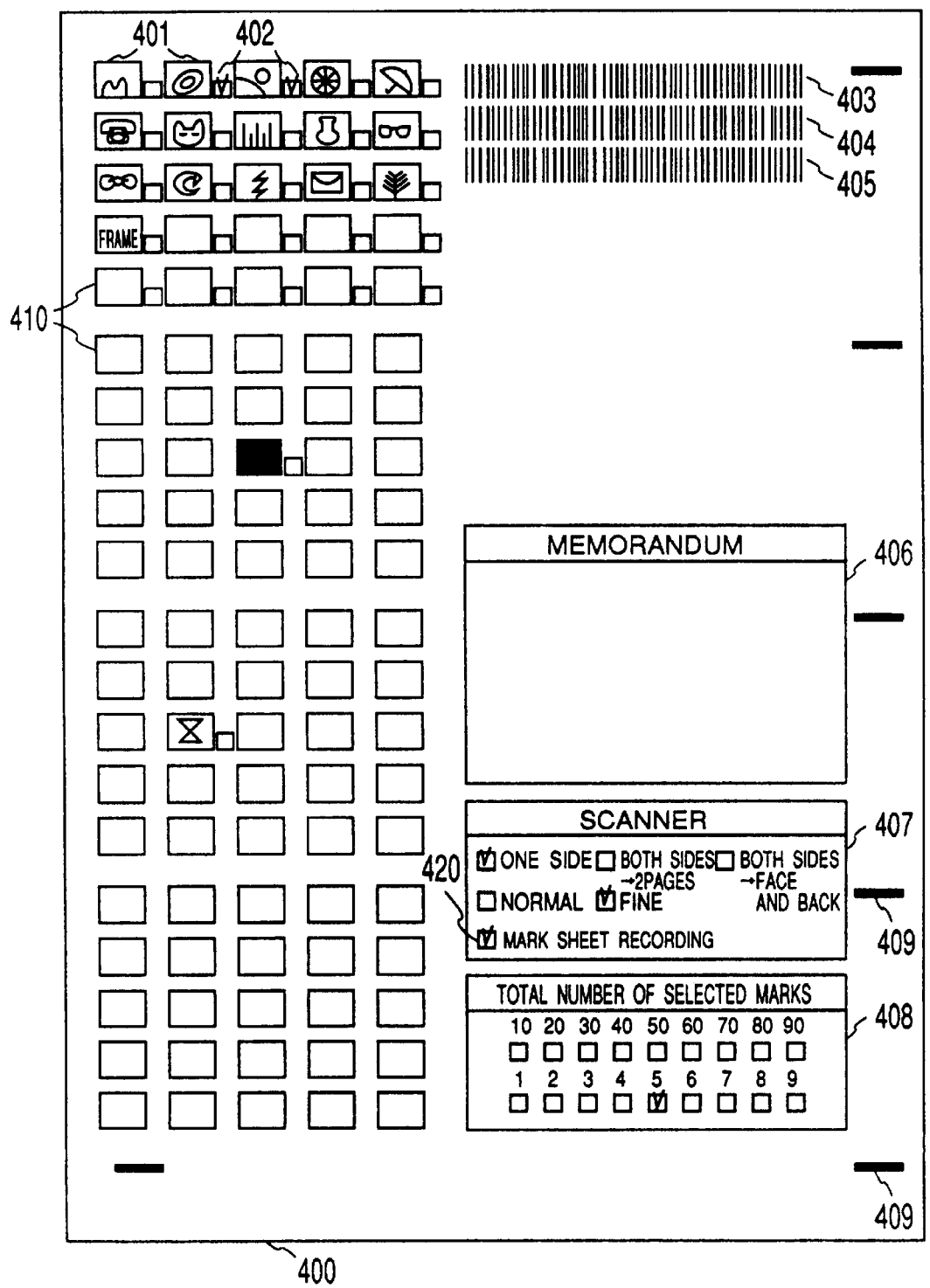
FIG. 5 is a view of an example of the mark sheet.

(3) Format and generation of mark sheet:

In the following there will be explained the format of the mark sheet. FIG. 5 shows an example of the mark sheet to be employed in the present embodiment.

In FIG. 5, index images 401 correspond, one-to-one, to data records 1-0, 1-1, . . . , 1-m stores in the index image file of the magneto-optical disk memory device 21. The data images read and registered by the image reading device 25 in advance are printed on the mark sheet, but frames 410 alone are printed corresponding to the index image areas in which the image record data are empty.

In the vicinity of each index image, there is provided a marking square 402, and the operator can select a desired index image by attaching a mark in the corresponding marking square. The marking squares are printed only corresponding to the index images with effective data, among the data records 1-0, 1-1, . . . , 1-m, but are not provided to the frames 410 in which the index images are not registered.

This is to prevent erroneous marking, by the operator, on a position corresponding to the aforementioned frame 410 in which the index image is absent, and such format simplifies the mark sheet and renders it more readily understandable.

An area 407 is used for designating the scanning mode in the image reading operation, and the operator can select, for example, the one- or both-side reading or the resolving power of the reading operation.

A bar code 404 represents the disk identification data stored in the magneto-optical disk memory 21. The index data may be different between different magneto-optical disks, so that each mark sheet has to specify the magneto-optical disk from which it is prepared. Said bar code 404 corresponds, one-to-one, to the disk identification data stored in the magneto-optical disk memory device 21.

A bar code 405 represents the index image identification data mentioned above. Even within a same magneto-optical disk, the index data may vary because of the alteration, addition and erasure of the index images. For this reason, the designation of the index image is accepted after confirmation that the set of the index images in the magneto-optical disk coincides with that of the index images on the mark sheet.

An area 408 is a check-sum area in which the total number of the marks given in the marking squares 402 is to be marked. This area is used for checking whether the marking sheet has been correctly read, by comparing the number of detected marks and the number given in the check-sum area at the reading of the marking sheet.

A marking square 420 is used for selecting whether the marking sheet itself is stored in the disk memory, at the reading of the original document.

A memorandum area 406 is used for arbitrary purpose, for example for recording a supplementary message relating to the document to be entered.

The memorandum area may be used, for example, for memorializing this marking sheet itself, as will be explained later. In this manner the operator can know, at the image search, the outline of the file by looking at this memorandum area in the first page, namely in the image of this marking sheet.

A reference mark 409 is used as the positional reference of mark detection at the reading of the marking sheet.

A bar code 403 represents the type of the sheet, and indicates that the marking sheet 400 is of the type shown in FIG. 5. A marking sheet of a different format may be used by varying the bar code 403.

Figure 6:
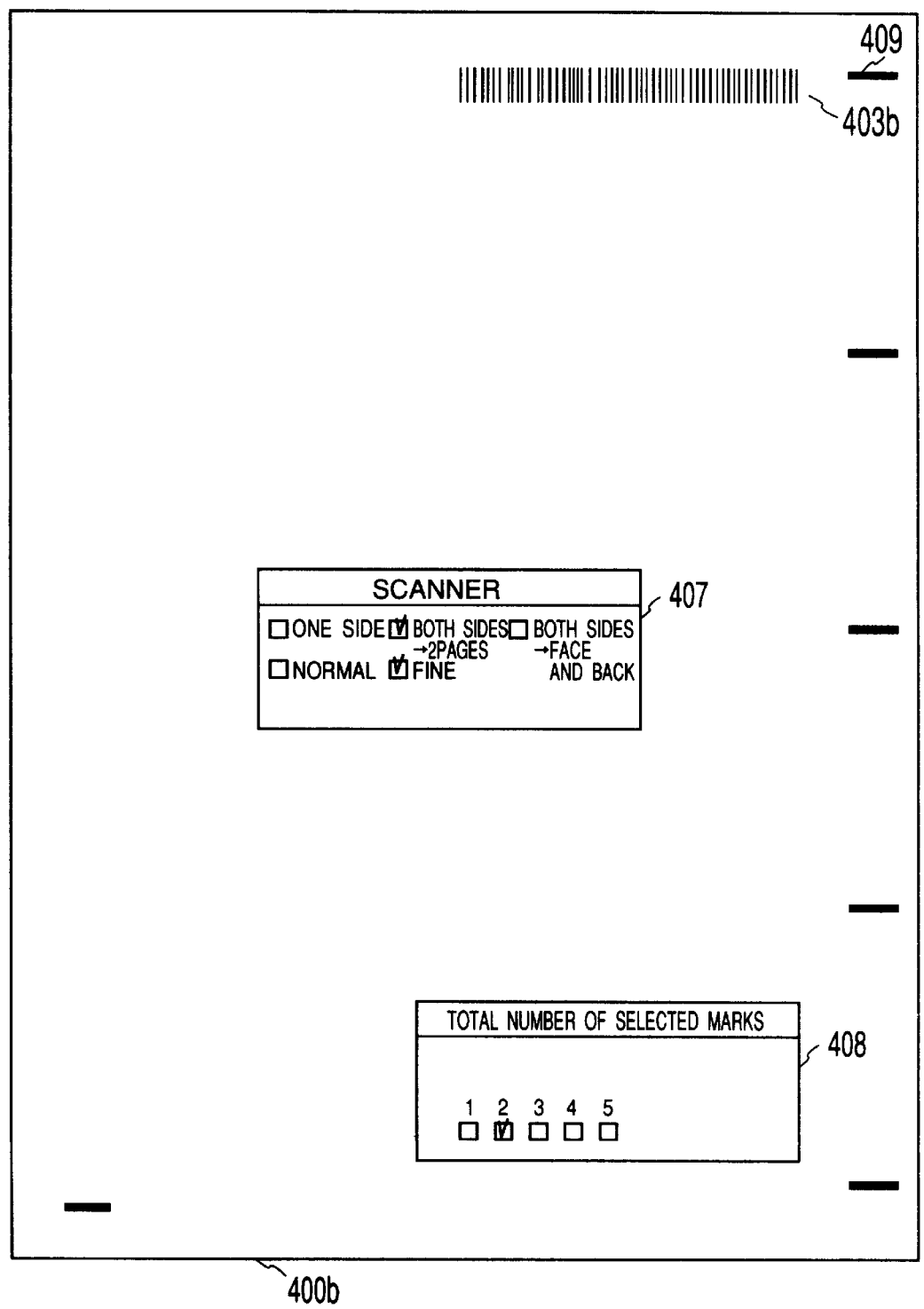
FIG. 6 is a view of another example of the mark sheet.

For example, a marking sheet 400b shown in FIG. 6 can be used for setting the reading mode, and the CPU 11 recognizes the format shown in FIG. 6 by reading a corresponding bar code 403b. The marking sheet 400b, designed to set the scanner mode to be explained later, does not bear the index image identification code or the disk identification code as they are unnecessary.

Figure 7:
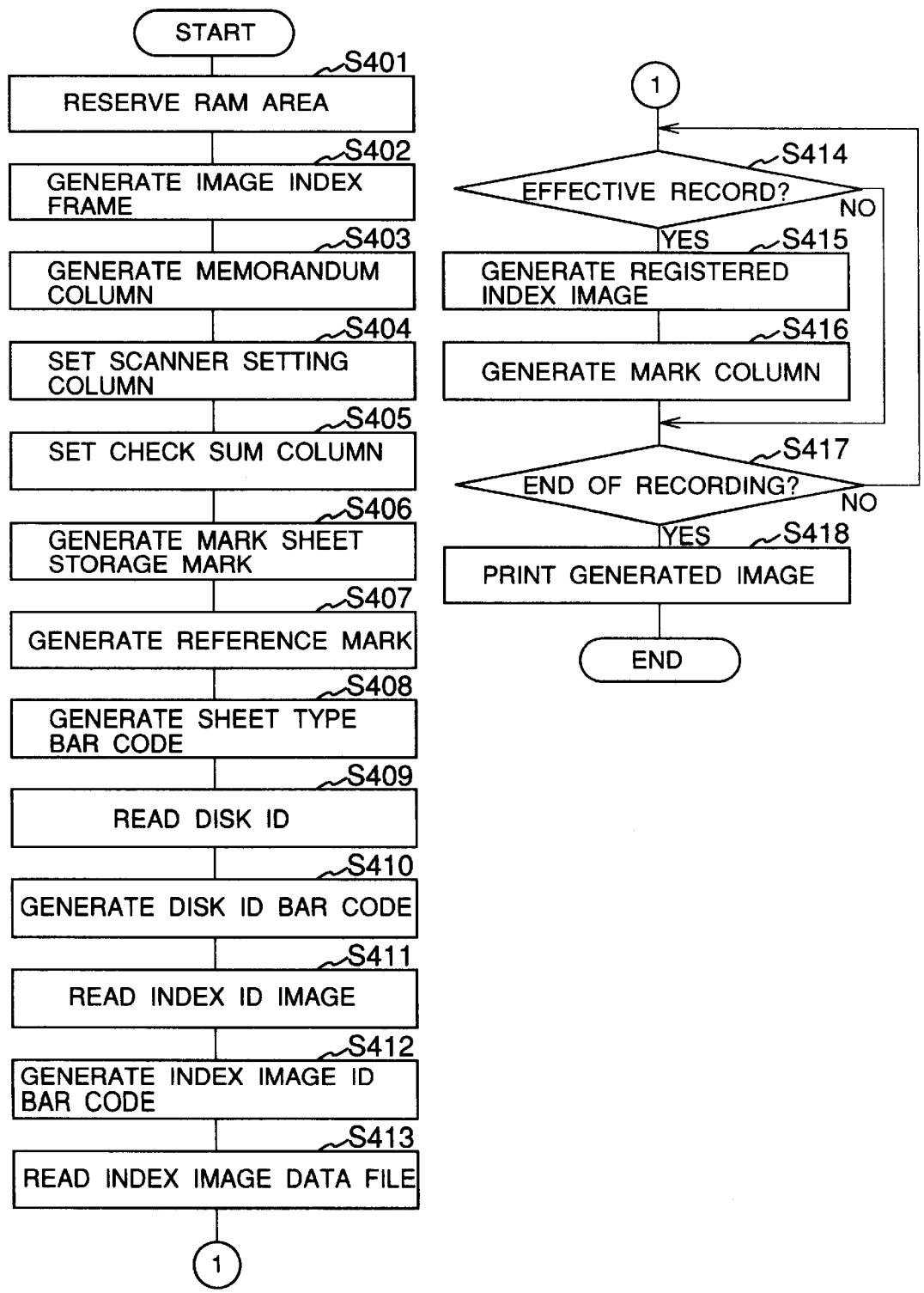
FIG. 7 is a flow chart showing a mark sheet generating sequence of the apparatus of the embodiment.

In the following there will be explained the method for generating the marking sheet, with reference to a flow chart shown in FIG. 7.

At first an area is secured in the RAM 13 for generating the marking sheet 400 (S401), and there are generated, in succession, the frames 410 for the index images, the memorandum area 406, the scanner setting area 407, the check-sum area 408, the marking sheet memory square 420, the reference mark 409 and the bar code 403 indicating the sheet type (S402–S408).

Then, the disk ID code, stored in the magneto-optical disk memory device 21, is read (S409) and a bar code corresponding to the ID code is generated on the RAM 13 (S410). Similarly, the index image ID code is read (S411) and a corresponding bar code is generated on the RAM 13 (S412).

Then, the index image data file 1 is read (S413), and the data of the data records 1-0, 1-1, . . . , 1-m are checked (S414). If the data are effective, the index images 401 are generated on the RAM 13 (S415), and the marking squares 402 are formed in the vicinity of the index images 401 (S416).

When the image data of the marking sheet is completed on the RAM 13, the image data are transferred to the image printing device 27 through the interface circuit 26 for printing (S418).

The order of sequence of generation of the areas on the RAM 13 is not critical and may be different from the above-explained example.

(4) Reading and auto indexing of the original:

The operator instructs, through the keyboard 15, the CPU 11 to read the image data to be subjected to image search, and sets the original document on the image reading device 25. Upon detection of the setting of said original through the interface circuit 24, the CPU 11 activates the image reading device 25 through the interface circuit 24 and reads the image data, compressed by an unillustrated compression unit, into the RAM 13.

Subsequently, the CPU 11 stores the compressed image data, on the RAM 13, in the information file area of the magneto-optical disk memory device 21 through the interface circuit 20.

Figure 8:
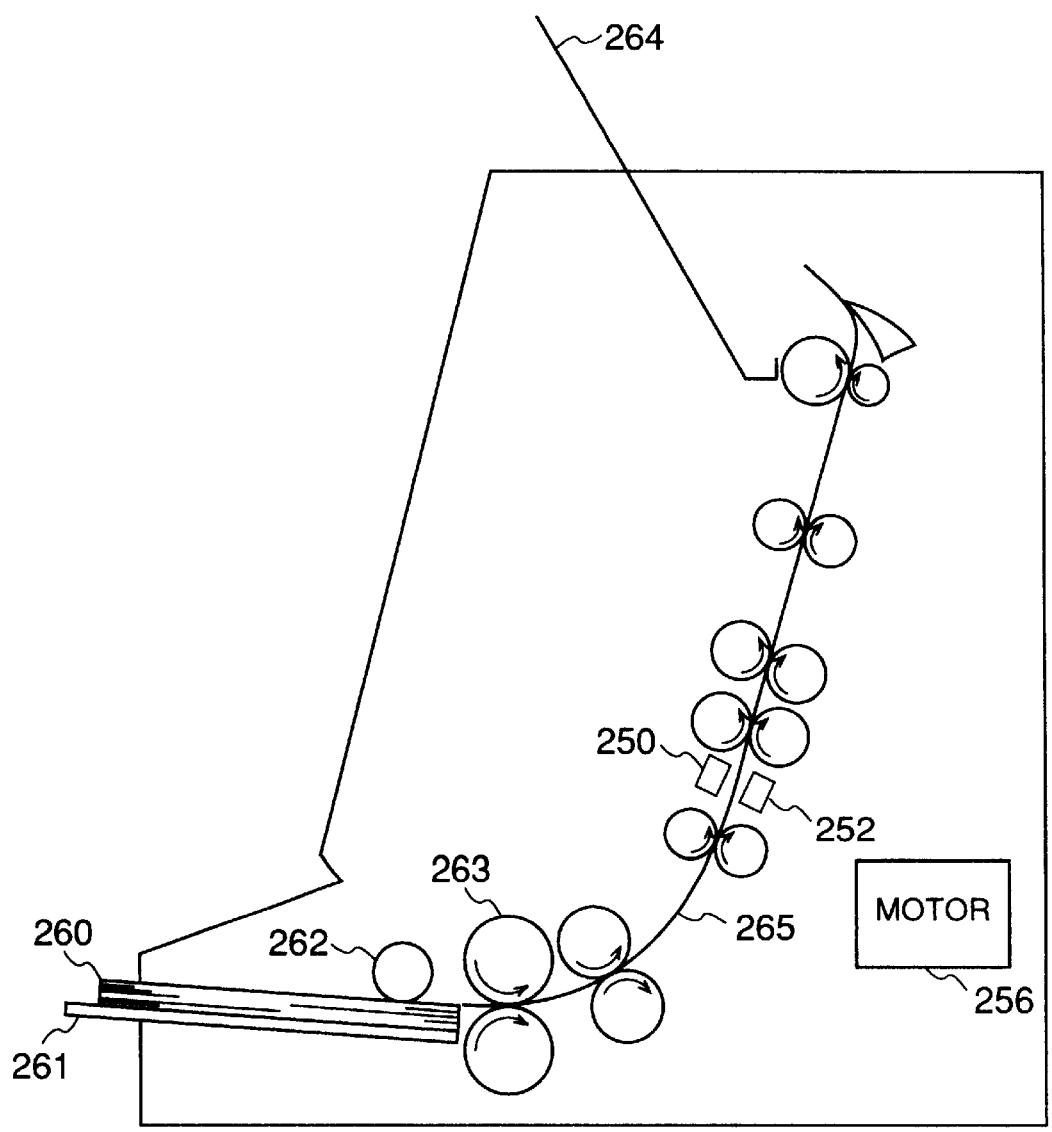
FIG. 8 is a cross-sectional view of an image reading device 25.

FIG. 8 is a cross-sectional view of the image reading device 25 employed in the present embodiment.

The original documents 260 to be subjected to storage are stacked on an original table 261. When the operator instructs the storage of the originals to the the CPU 11 from the keyboard 15, the CPU 11 activates a motor 256 of the image reading device 25 through the interface circuit 24.

The image reading is conducted in the following reading modes.

Figure 9:
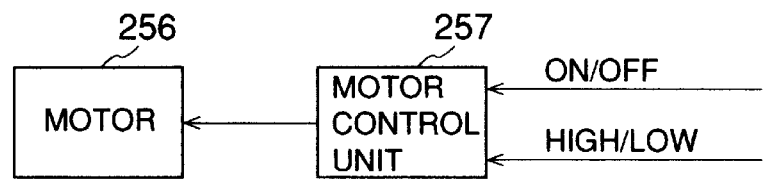
FIG. 9 is a block diagram of a motor driving circuit for driving a motor 256 of the image reading device 25.

FIG. 9 is a block diagram of a motor control system in the image reading device 25. A motor control unit 257, for controlling the speed of the motor 256, is given drive/stop instructions and instructions for two different speeds from the CPU 11.

These instructions provide a "fine" mode with a high resolution and a low speed, and a "normal" mode with a low resolution and a high speed.

The CPU 11 instructs the motor control unit 257 to rotate the motor 256 at a high or low rotating speed respectively in the normal or fine mode.

The motor 256 rotates a feed roller 262 and transport rollers 263 shown in FIG. 8 through an unillustrated transmission mechanism.

The both- or one-side reading of the original is achieved in the following manner.

When the original proceeds along a transport path 265 in the image reading device 25 and reaches the position of a top-side CCD (CCD for face) 250 and a bottom-side CCD (CCD for back) 252 constituting the photoelectric conversion devices for image reading, the images on both sides of the original are read simultaneously.

Figure 10:
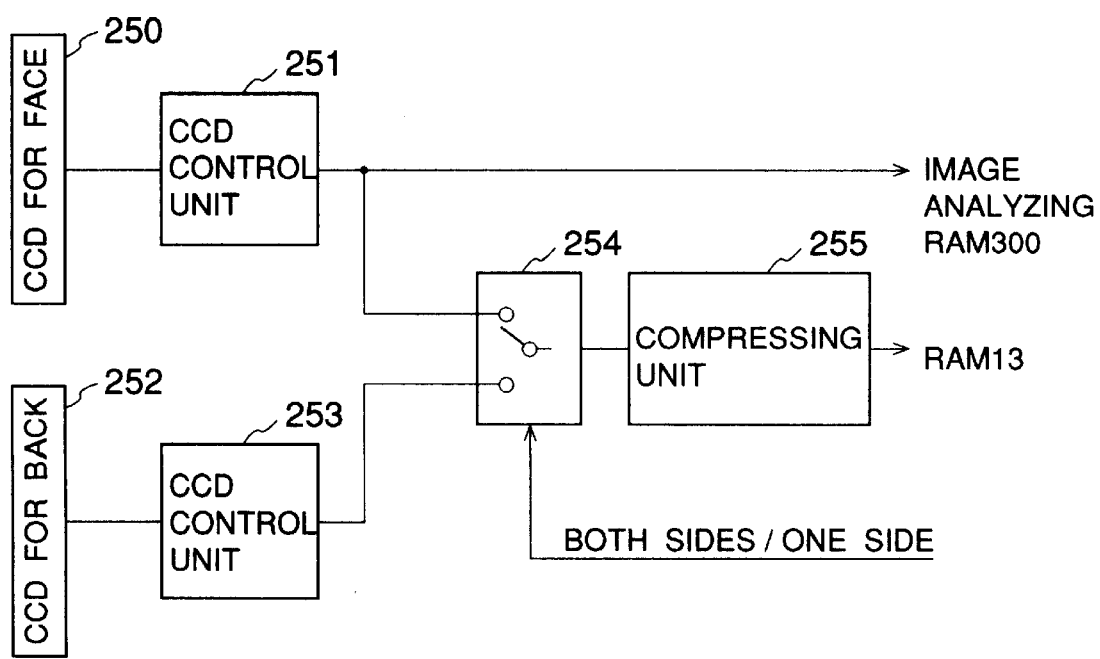
FIG. 10 is a block diagram of a DDC driving circuit for driving CCD's 250, 252 of the image reading device 25.

FIG. 10 is a block diagram of the configuration relating to the image reading.

The top-side CCD 250 and the bottom-side CCD 252 are respectively driven by CCD drive units 251, 253.

The image data from both sides of the original are supplied to a line switching unit 254, which serves to transmit the data of a main scanning line from the top-side CCD 250 and, by shifting an internal switching device, the data of a main scanning line from the bottom-side CCD 252. Thus, the image data from the top and bottom sides are transformed into serial data, in the unit of a main scanning line, and are transferred to a succeeding compression unit 255.

The both-side image reading is conducted as explained above. On the other hand, in case the CPU 11 instructs the one-side image reading to the line switching unit 254, the above-explained switching operation is not conducted and the image data from the top-side CCD 250 are continuously transmitted to the succeeding stage.

The image data transferred to the compression unit 255 are subjected to data compression, for example, by MH, MR or MMR encoding, and transferred further to the RAM 13.

In addition, the image data from the top-side CCD 250 are stored, without any compression as shown in FIG. 10, into an image analyzing RAM 300.

Figure 11:
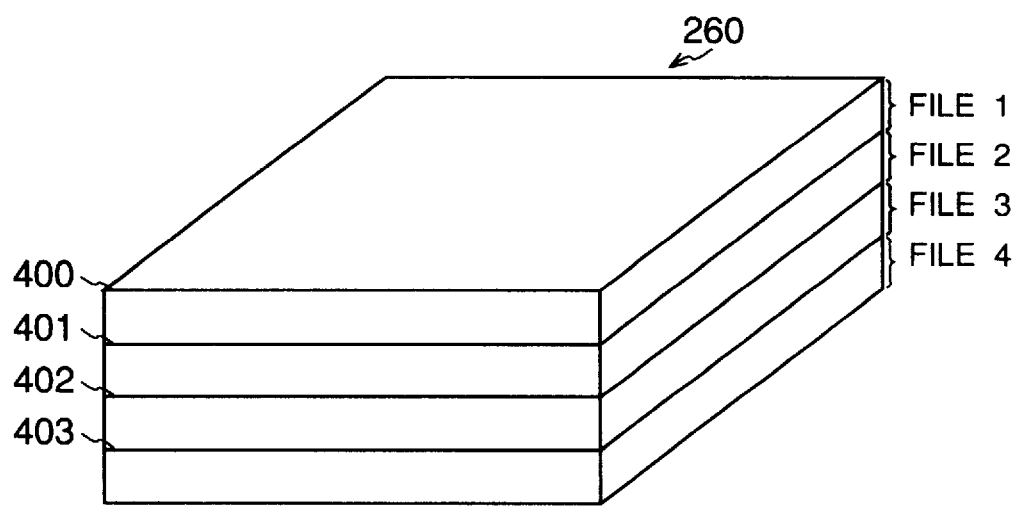
FIG. 11 is a perspective view showing a stack of original documents to be read.

It is assumed that plural files, each having a marking sheet 400 at the first page, are stacked on the table 260 as shown in FIG. 11. Thus, at this stage, the image analyzing RAM 300 stores the marking sheet 400 of the first file, said sheet being marked in advance by the operator corresponding to the indexes to be given to the first file.

The two-side mode square is marked if the first file consists of the two-side originals. Also, the fine mode square is marked if the first file is to be stored with the fine mode. Also, the marking sheet memory square is marked if the marking sheet 400 itself is to be memorized.

Figure 12:
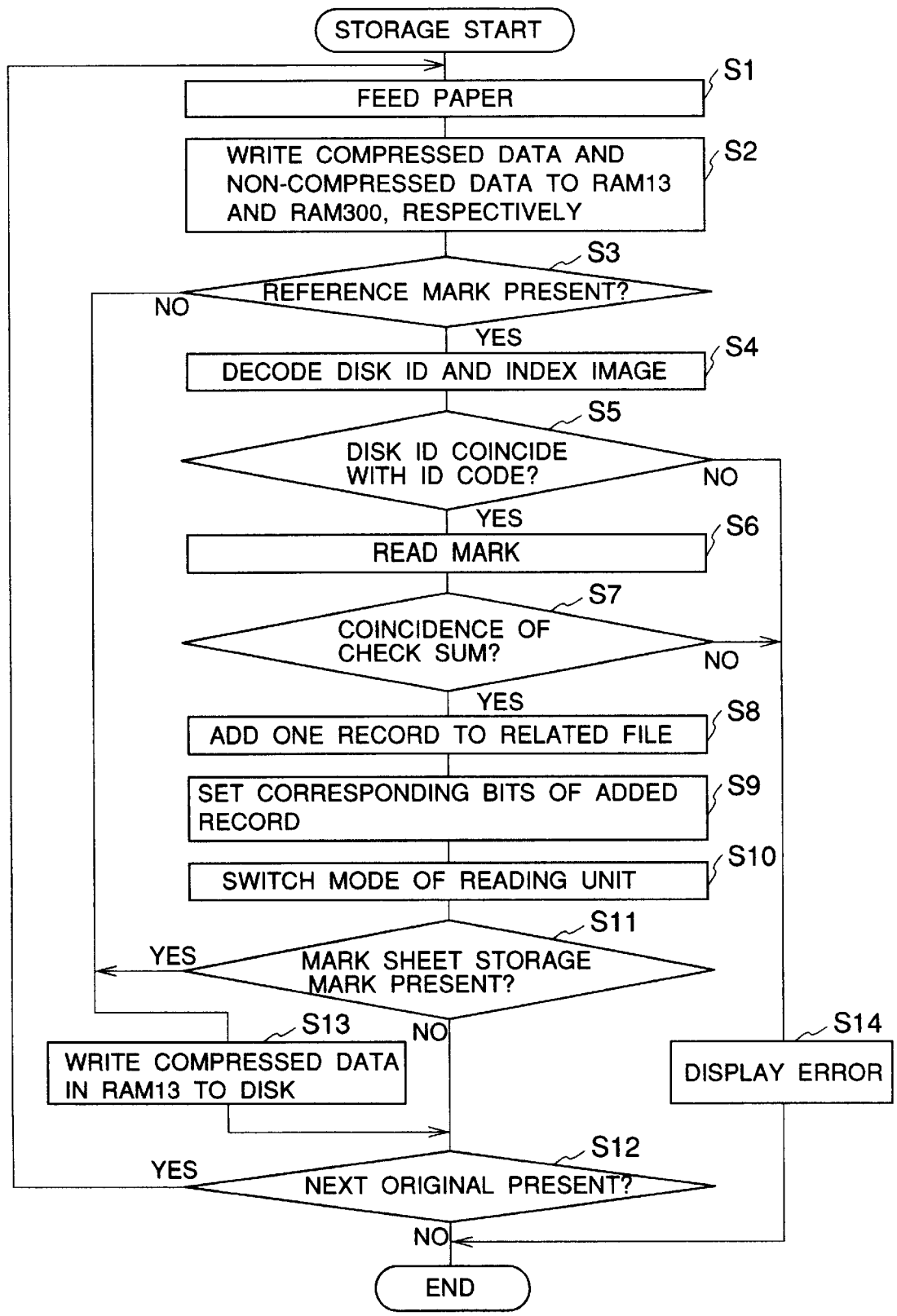
FIG. 12 is a flow chart showing a mark sheet reading sequence of the apparatus of said embodiment.

FIG. 12 is a flow chart of the storage operation, in a program stored in the ROM 12.

The original document 260 is fed by the feed roller 262, and, upon reaching the position receiving the driving force from the transport rollers 263, is thereafter transported by the transport rollers 263 (S1).

The top-side image of thus transported original is read by the top-side CCD 250, and the compressed data of the image are stored in the RAM 13 and the uncompressed data are stored in the image analyzing RAM 300 (S2).

The CPU 11 inspects the uncompressed image data of the marking sheet 400 stored in the image analyzing RAM 300, by at first looking for the reference mark.

The CPU 11 recognizes the marking sheet 400 by detecting the reference mark (S3). This step S3 identifies the marking sheet or the ordinary original by said reference mark only, because the reading of the entire marking sheet requires a longer time. Thus the storage of the ordinary original document is not delayed unnecessarily.

The reference mark is used, not only for indicating the marking sheet 400, but also for enabling the CPU 11 to detect the positional aberration of the marking sheet 400 in the image analyzing RAM 300, namely the skew and the aberrations in the advancing direction and in the transversal direction of the marking sheet 400.

The CPU 11 can correct the aberrations of the marking squares from the normal positions, by the detected position of the reference mark in the image analyzing RAM 300.

Then, the CPU 11 decodes the disk ID code and the index image ID code represented by the bar codes (S4), and discriminates whether these two ID codes coincide with those stored in the disk loaded at this point in the magneto-optical disk memory device 21 (S5).

In case of no coincidence, the image indexes marked on the marking sheet 400 may be different from those stored in the disk, so that an error message is displayed on the liquid crystal display 23 and the storage operation is terminated (S14).

In case the coincidence is found in the step S5, the marks on the marking squares are inspected in order to obtain the image indexes to be given to the file to be read after the marking sheet and the information on the setting of the reading mode, namely on the one- or two-side reading and on the normal or fine mode reading (S6).

After the inspection of all the marking squares, there is discriminated whether the total number of detected marks coincides with the number of marks attached by the operator, as indicated in the check-sum area (S7).

In case of no coincidence, the marks may be erroneously read for example by the smear on the marking sheet. Thus, an error message is displayed on the liquid crystal display 23, and the storage operation is terminated (S14).

Figure 13:
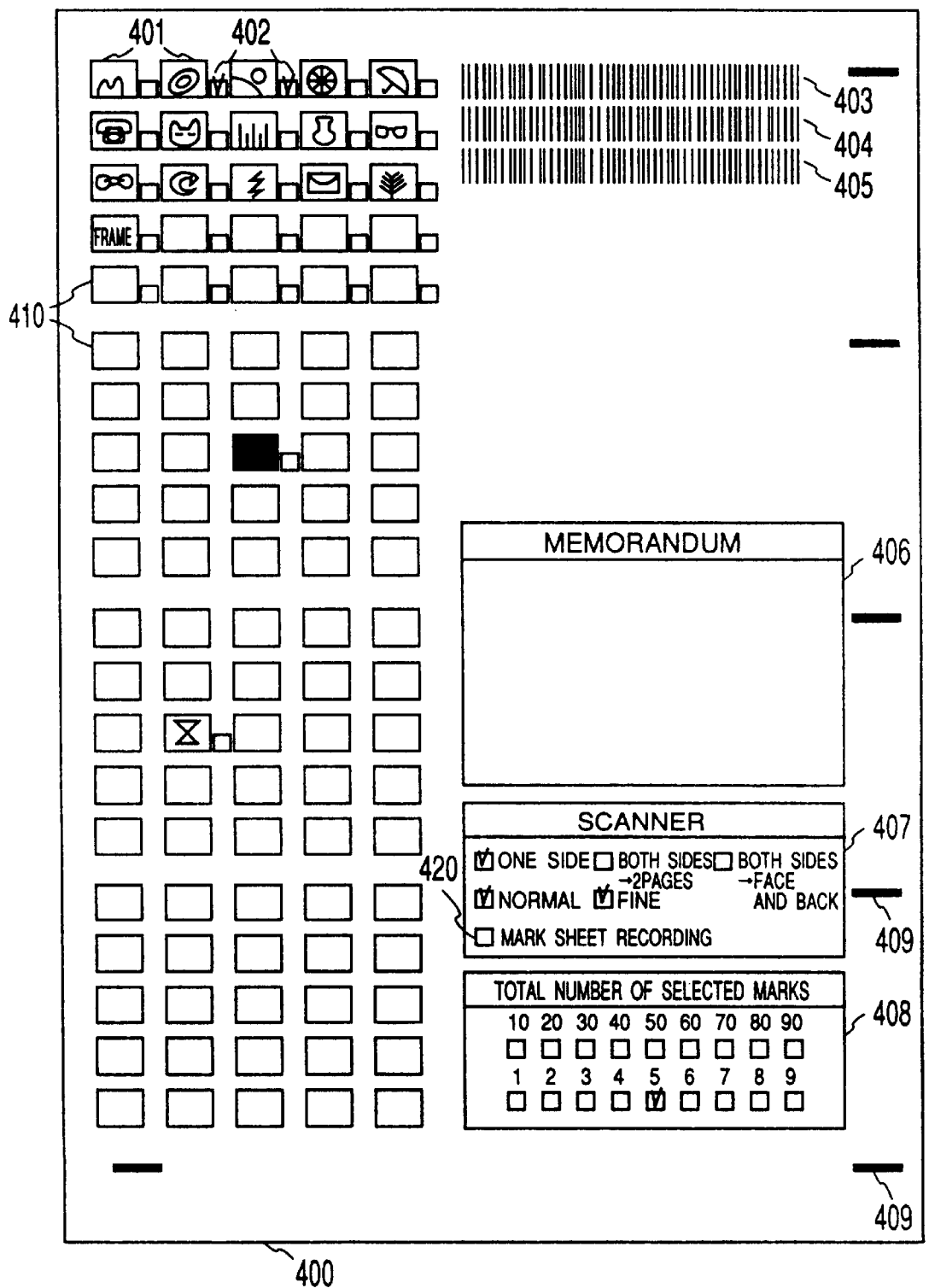
FIGS. 13 to 15 are views showing examples of marking on the mark sheet.
Figure 14:
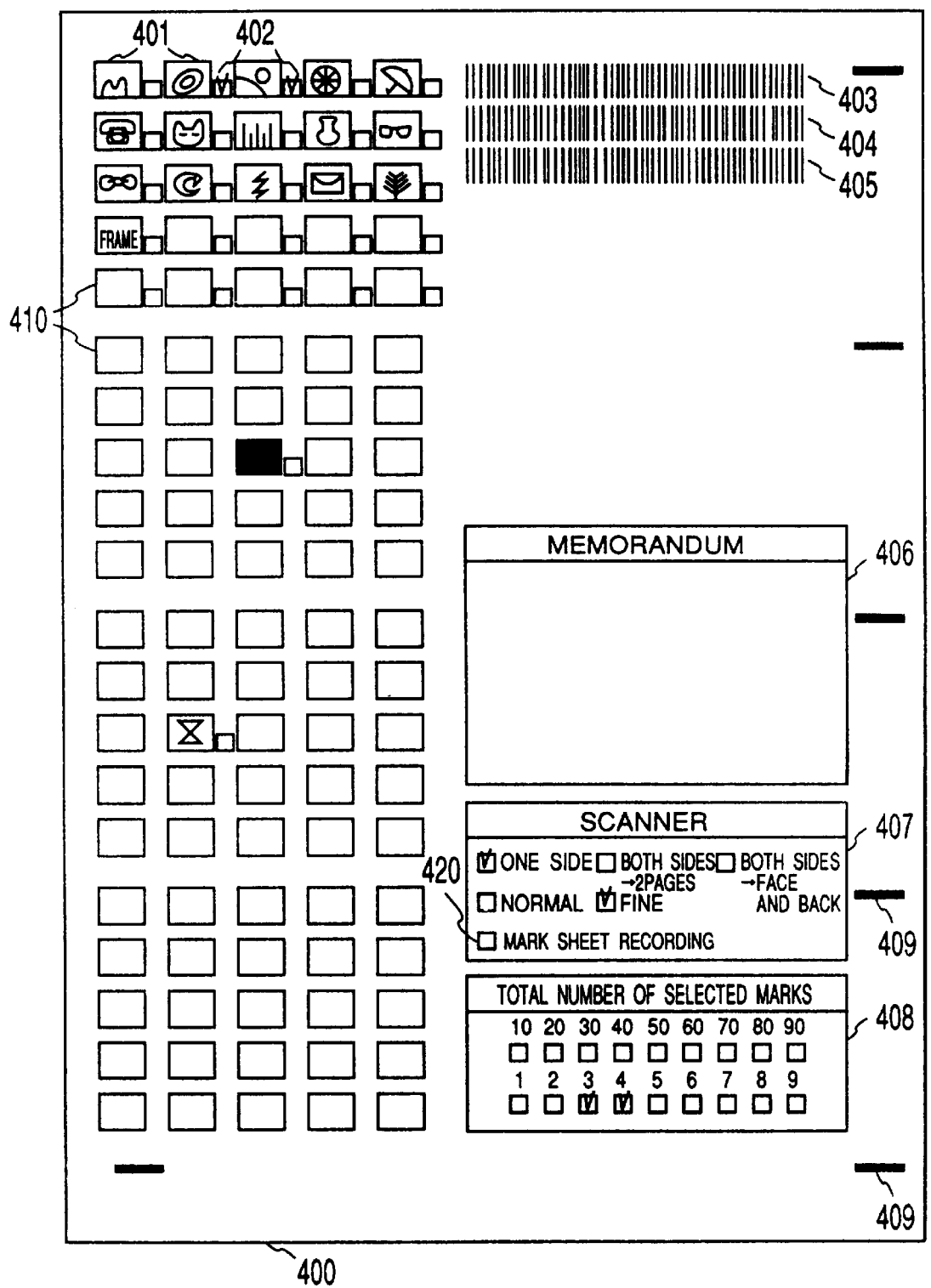

The above-explained step S7 also includes inspections for contradicting errors, such as marks given to both the normal and fine modes for scanning setting as shown in FIG. 13, or marks attached to the squares "3" and "4" as shown in FIG. 14.

Also, in case of detection of such contradicting error, an error message is displayed on the liquid crystal display 23 and the storage operation is terminated (S14).

In case the step S7 detects the coincidence, there is identified the start of a new file and a new record is generated in the aforementioned related file (S8).

Then, in the new record, bits are set corresponding to the index images marked in the marking squares (s9).

Then, the setting of the two- or one-side mode is altered, by inspecting the mark in the marking squares for the scanning mode mentioned before.

In the present embodiment, the scanning mode can be selected from three modes, namely from a one-side mode, a two-side=two-page mode, and a two-side=top/bottom mode.

If the marking square for the one-side mode is marked, the line switching unit 254 in FIG. 10 is given an instruction for one side, in order to transmit only the image data from the top-side CCD 250, and the information file group 5 shown in FIG. 2 stores information, relating to the newly generated information file, that the storage is conducted by the one-side mode.

If the marking square for the two-side =two-page is marked, the line switching unit 254 is given an instruction for two sides, in order to transmit the image data from the top-side CCD 250 and the bottom-side CCD 252 as explained before, and the information file group 5 stores information, relating to the newly generated information file, that the storage is conducted by the two-side=two-page mode.

In the two-side=two-page mode, in the display or printing of this file, the image on the bottom side is handled as a next page to the image on the top side. For example, in response to an instruction to display a next page given from the keyboard 15 while the image of the top side is displayed, there will be displayed the image of the bottom side.

If the marking square for the two-side=top/bottom mode is marked, the line switching unit 254 is given an instruction for two sides, in order to transmit the image data from the top-side CCD 250 and the bottom-side CCD 252 as explained before, and the information file group 5 stores information, relating to the newly generated information file, that the storage is conducted by the two-side=top/bottom mode.

In the two-side=top/bottom mode, in the display or printing of this file, the top or bottom side remains unchanged. Thus, while the image of the top side is displayed, in response to an instruction to display the image of the bottom side from the keyboard 15, there will be displayed the image of the bottom side.

Also, if the image printing device 27 is capable of printing on both sides of a sheet, the image stored as the top side will be printed on the top side of the sheet while that stored as the bottom side will be printed on the bottom side.

In the reading resolution in the scanner setting area 407, if the marking square for the normal mode is marked, the motor control unit 257 is given an instruction for a high motor rotating speed, in order to read the new file, starting from the next original, with the normal mode. On the other hand, if the marking square for the fine mode is marked, the motor control unit 257 is given an instruction for a low motor rotating speed, in order to read the new file with the fine mode (S10).

Figure 15:
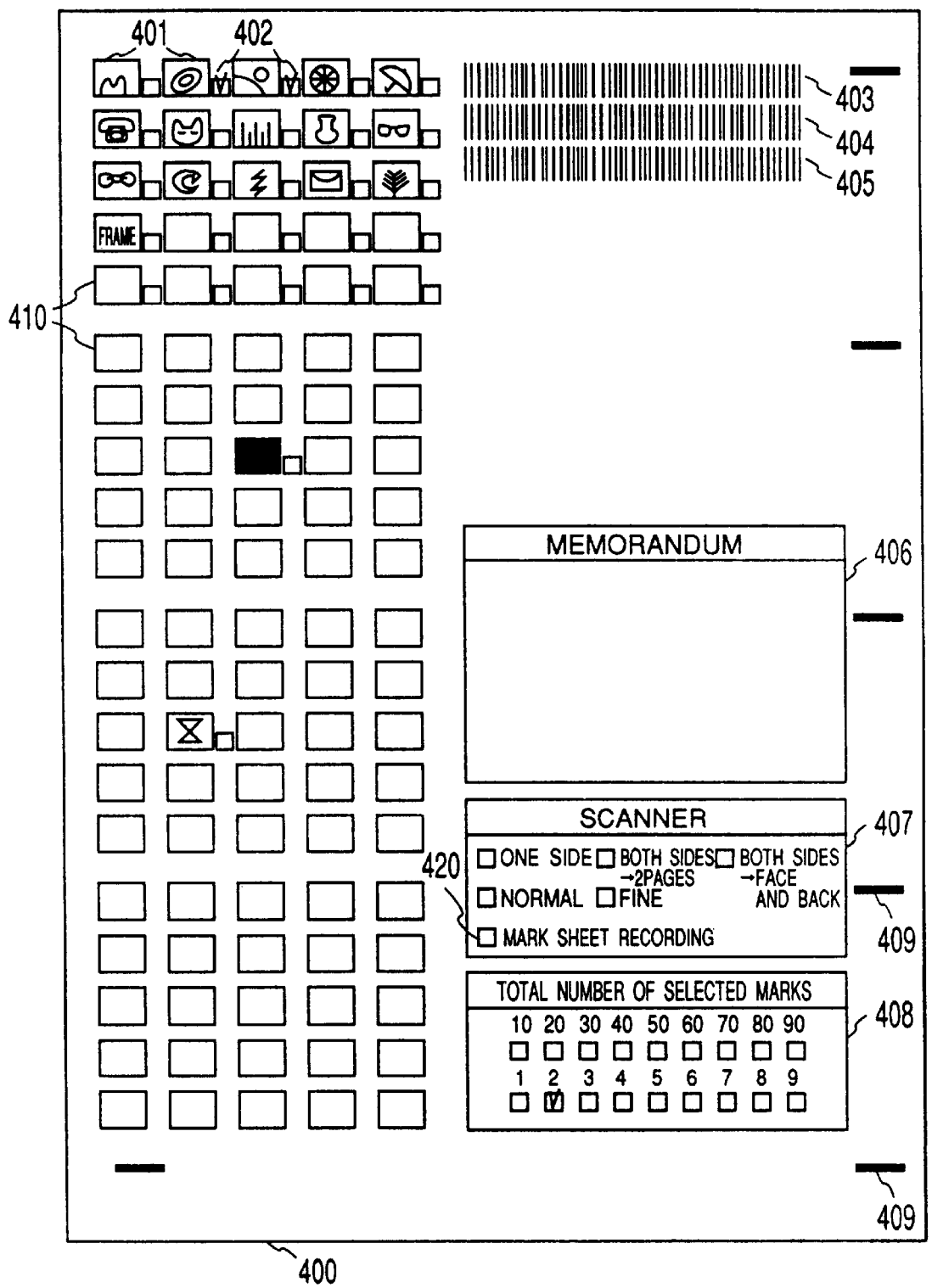

In the present embodiment, if no marking is detected for the selection of one of plural modes, such as the normal or fine scanner mode, as shown in FIG. 15, the CPU 11 continues the state which has been selected before. For example, in case of Fig. 15, the scanner setting remains same as before.

Then, if the marking sheet memory marking square in the scanner setting area 407 is marked, the compressed image data stored in the RAM 13 are written into the magneto-optical disk (S11, S13).

A next step S12 discriminates the presence of a next original, whereupon the sequence returns to the step S1. As the second and subsequent sheets of the first file shown in FIG. 11 are not the marking sheets 400 but the ordinary originals, the step S3 does not detect the reference mark, so that there are only executed the storage of the image data in the step S13.

Thereafter, also for the files 2, 3, 4 shown in FIG. 11, the automatic selection of the index images and the automatic setting of the scanner mode are executed by the marking sheets 401, 402, 403 positioned at the start of the respective files.

The marking sheet 400, 401, 402 or 403 is never added as the final page of the preceding file even if the selected index images of the marking sheet are identical with those in the preceding file, because a new record is generated in the related file as shown in the step S8 at the detection of the marking sheet.

(5) Manual indexing:

The manual indexing can be executed by the operator in the following manner.

At first the image to be indexed is loaded from the information file area of the magneto-optical disk memory device 21, through the interface circuit 20, to the RAM 13, and is displayed on the liquid crystal display 23 through the interface circuit 22. The image reading from the magneto-optical disk may be conducted, for example, in the order of image reading from the original documents.

The operator observes the displayed image, then selects an index image corresponding to the content of the displayed image, and designates the row and the column of said index image by the keys 15-0–15-8.

The CPU 11 sets a bit "1" corresponding to the designated index image, among the bits corresponding to the image to be indexed, in the related data file 2.

The manual indexing is completed by repeating the above-explained operations.

The CPU 11 maintains the same related data in the RAM 13, and the magneto-optical disk memory device 21 or the floppy disk device 19.

As explained in the foregoing, the indexing can be made automatically or manually.

(6) Search sequence:

The indexed images can be searched in the following manner.

At first the operator instructs the image search by the keyboard 15, and, among the index images displayed on the liquid crystal display, designates the row and the column of an index image relating to the image to be searched, by means of the keys 15-0–15-8. There may be designated plural index images. Otherwise, the index images to be searched may be recognized by reading a marking sheet, marked as shown in FIG. 5, by means of the image reading device.

Then, the CPU 11 searches, in the bit trains, a bit pattern specified by the designated index image. The image data corresponding to such a bit pattern satisfy the searching conditions.

There may be found plural images satisfying the searching conditions. In such case such images may be displayed in succession, or there may be displayed the number of found images.

As explained in the foregoing, the present embodiment dispenses with the indexing operation at the image storage operation, by preparing a marking sheet, which bears the reference mark, the sheet type ID code, the disk ID code, the index image ID code, the selection of index image, the scanner mode, the marking sheet storage mode, etc. in a mechanically readable format, by the image information processing apparatus itself, by inscribing necessary information into the marking sheet by the operator and by reading the sheet with the image information processing apparatus at the storage of the images. It is therefore rendered possible to store plural files in collective manner, and to eliminate the cumbersome operation of interrupting the image storage for each file and renewing the indexes for each file.

Also, the present embodiment can separate the image storage operation and the operation of considering the index to be attached to the image, whereby the image storage operation can be executed in prompt manner.

Consequently, even in a situation in which an image information processing apparatus is commonly used by plural operators, the possibility that the apparatus is occupied solely by a single operator for such image storage operation is reduced.

Also, the method of designating the image index or other information by inscribing marks onto the marking sheet is familiar to the operator, in comparison with the conventional method of designation by the keys. Furthermore, the present embodiment dispenses with preliminary operation, such as the menu selection, prior to the actual index image selecting operation.

Furthermore, the present embodiment minimizes the loss in the reading speed of ordinary images, since the marking sheet is identified by the reference mark.

Also, the type of the marking sheet is recorded on said sheet itself, so that, when the sheet format is altered, such change in the sheet format can be easily recognized by the apparatus.

Furthermore, in the present embodiment, since the marking sheet bears thereon the disk ID code and the index image ID code, there will be no mistakes in the indexing. Also, the presence of the check-sum area significantly reduces the possibility of errors resulting from the smear or the like of the marking sheet.

Also, as the marking sheet is prepared by the image information processing apparatus itself, the present embodiment can be realized easily, without the necessity for a new printing apparatus for the marking sheet.

Also, in the present embodiment, since the setting of the scanner mode can be given by the marking sheet, a collective image reading operation is rendered possible even in case two-side originals and one-side originals are mixed, by inserting a marking sheet between such originals. There is no longer required a cumbersome operation of interrupting the image reading operation and changing the mode of image reading when the originals are changed for example from the one-side originals to the two-side ones.

In the above-explained embodiment the image analyzing RAM 300 is provided exclusively for analyzing the marking sheet, but it may be replaced by another memory, such as the image memory used for the display, printing or disk storage of the image.

Figure 16:
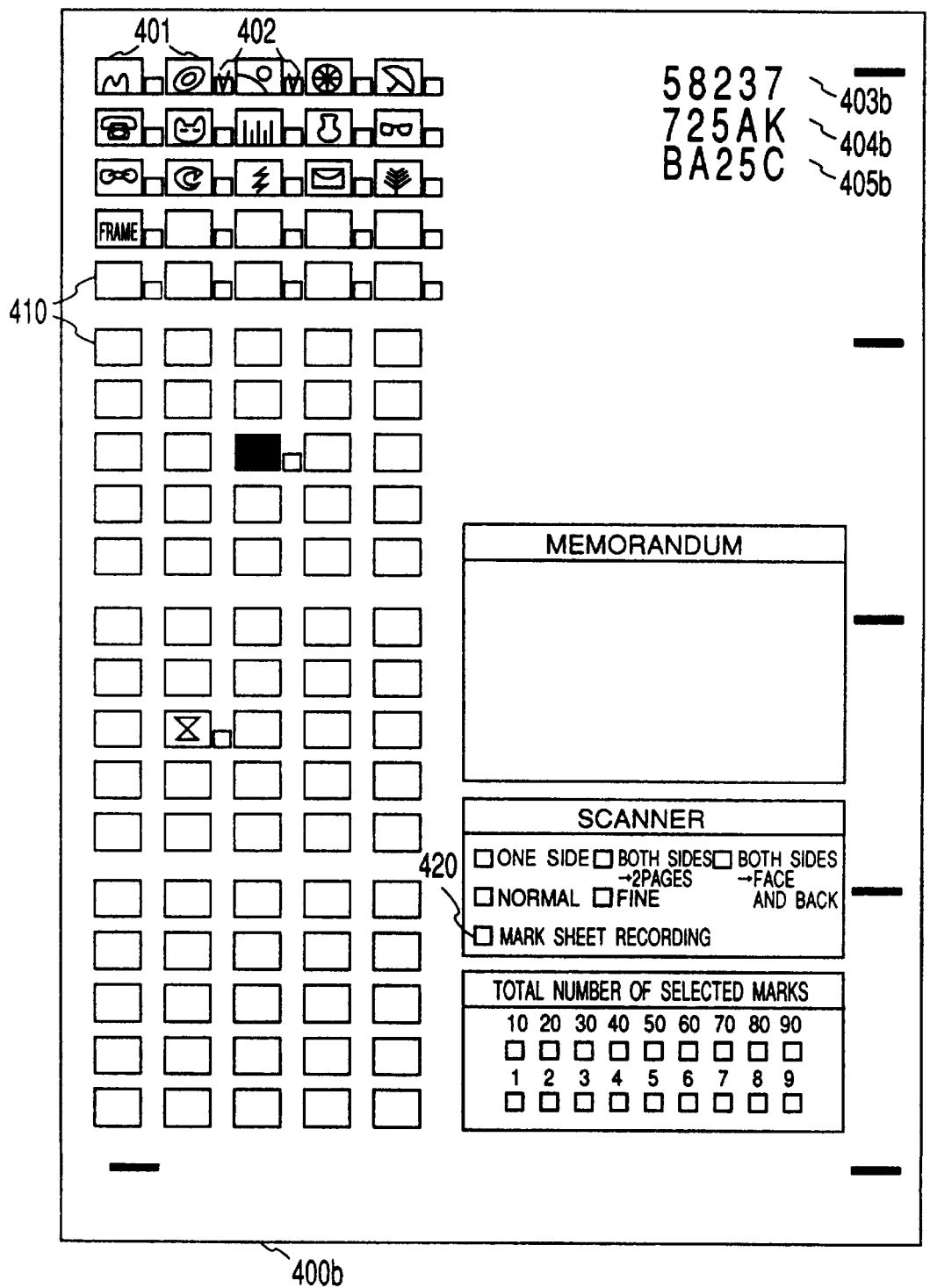
FIG. 16 is a view showing an example of the mark sheet.

Also, in the above-explained embodiment, the sheet type code, the disk ID code and the index image ID code are printed and read by bar codes, but these information may also be selected by the marking squares in the same manner as the index images, or by characters or other machine-readable methods as indicated by 403*b*, 404*b*, 405*b* in FIG. 16.

Also, in the above-explained embodiment, the marking sheet is printed by the image information processing apparatus, but the marking sheet may be reproduced, for example by a copying machine, from the sheet printed by said apparatus.

Also, in the above-explained embodiment, the marking sheet is placed at the start of each file, but it may also be placed in any predetermined position in the file. For example, it may be read at the end of each file.

As explained in the foregoing, the indexing to each file is executed by preparing a machine-readable sheet based on the information held by the image information processing apparatus, and reading the selection of the index image inscribed on the sheet which is read by the image reading device at the image reading operation of the file, so that the manual indexing operation is no longer required and the operability of the apparatus is greatly improved.

It is also rendered possible to collectively read plural files with inserted marking sheets each of which bears identification information for controlling each file, and the operating efficiency of the apparatus is improved also in this respect.

In the following there will be explained a method for correcting, the aberration, elongation, contraction, rotation or distortion of the image, utilizing the reference mark as shown in FIGS. 5 and 6.

At first there will be explained the analysis of the reference mark, on a marking sheet 90 shown in FIG. 17.

Figure 18:
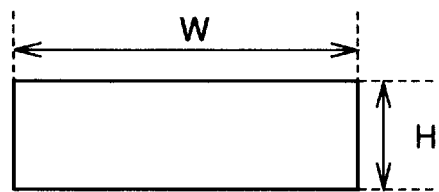
FIG. 18 is a plan view of a reference mark.

The reference mark has a rectangular shape with a height H and a width W as shown in FIG. 18. The corresponding image data are developed in the RAM 13, in a bit pattern with white bits "0" and black bits "1", and the reference mark area read by the image reading device 25 consists of black data.

Figure 19:
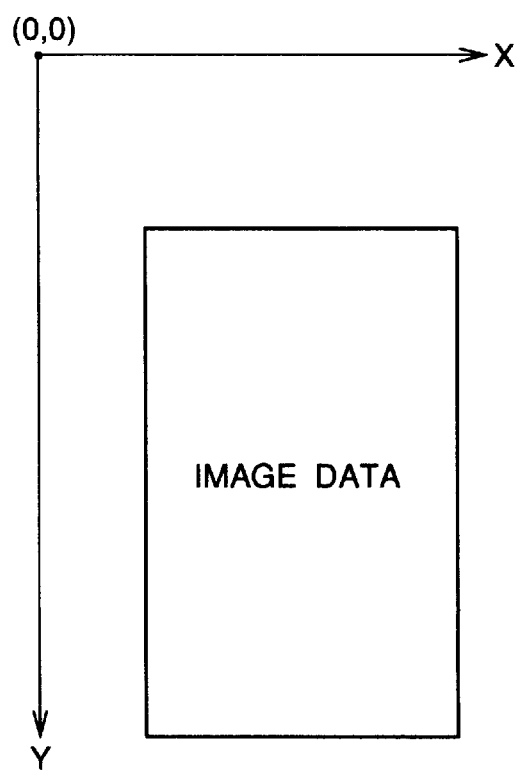
FIG. 19 is a view showing the coordinate system in image reading.
Figure 20:
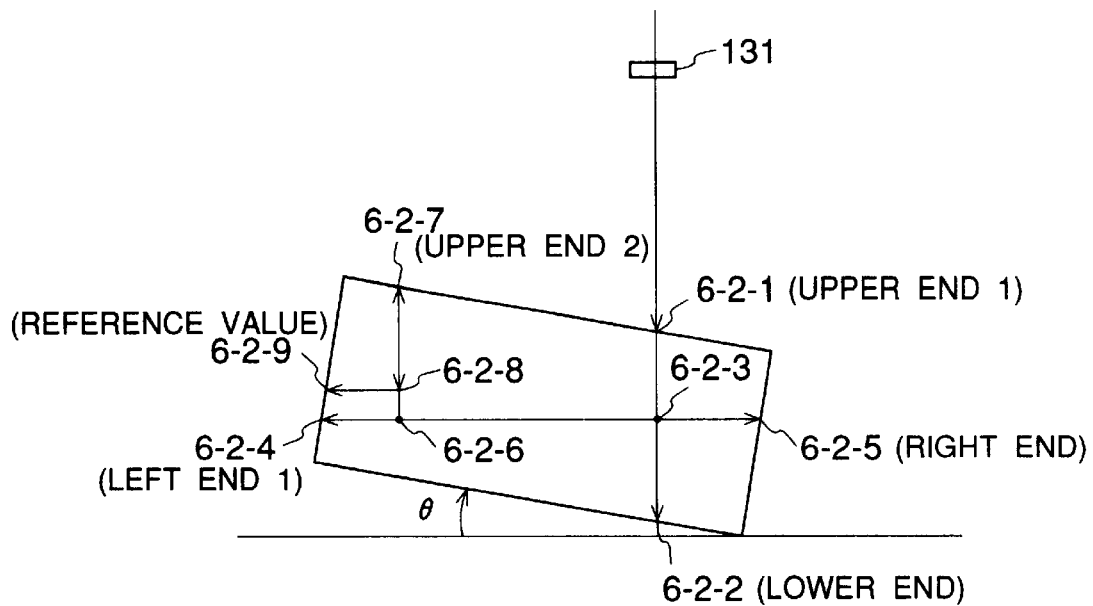
FIG. 20 is a diagram showing the sequence for recognizing the shape of the reference mark.

Also, it is assumed that the read image data are represented by an orthogonal X-Y coordinate system as shown in FIG. 19, in which the rotation angle $\theta$ is taken positive in the clockwise rotation. On said coordinate system there is set a small window area 131, as shown in FIG. 20, in which the white and black bits are counted. An initial position (111 in FIG. 22) of the window area 131 is assumed to be capable of absorbing the positional aberration in the reading by the image reading device 25.

The geometrical shape of said reference mark is not particularly limited to the rectangular shape. Also, the values of the conditional relations to be explained in the following vary depending on the precision of the image reading device and the geometrical shape of the reference mark, and may be different from those shown in the present embodiment.

Figure 21:
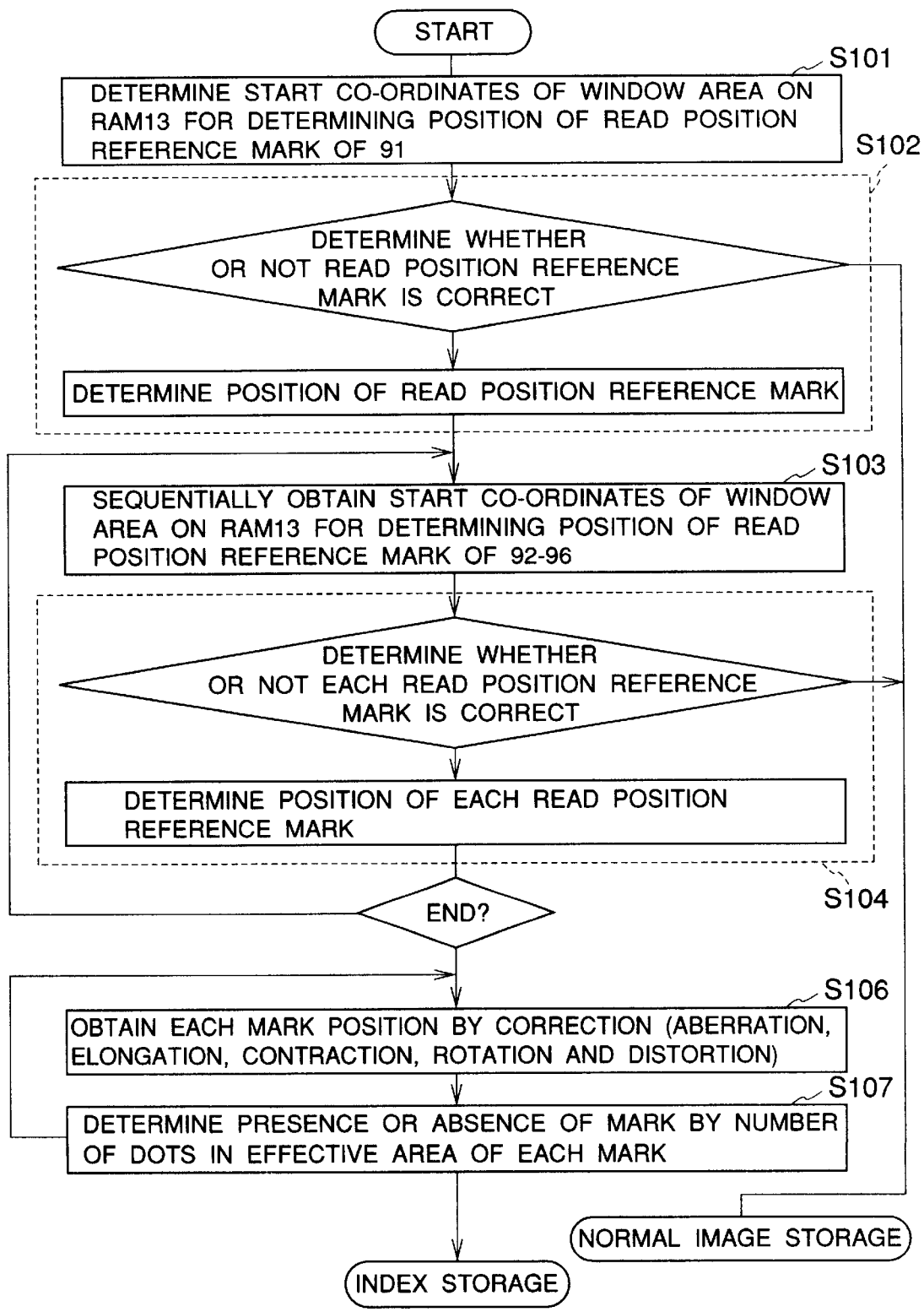
FIG. 21 is a flow chart showing the mark reading sequence.
Figure 22:
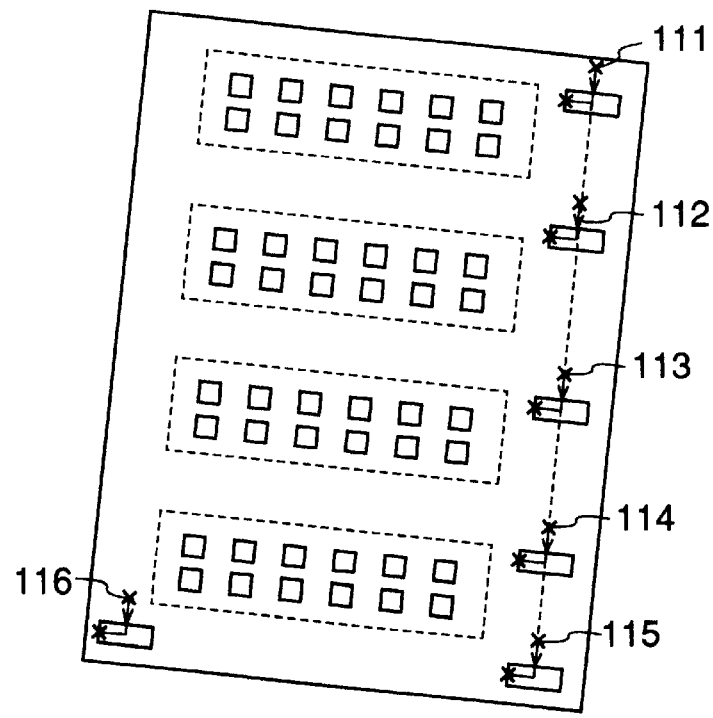
FIG. 22 is a view showing the sequence for reaching the reference mark.

FIG. 21 is a flow chart showing the sequence of mark reading, of which details will be explained in the following, from [6-1] to [6-4]:

[6-1] Sequence of determining the positions of the reference marks 91–96 in succession (S101–S104 in FIG. 21):

FIG. 22 is a schematic view showing the outline of the reference mark reading sequence.

Figure 17:
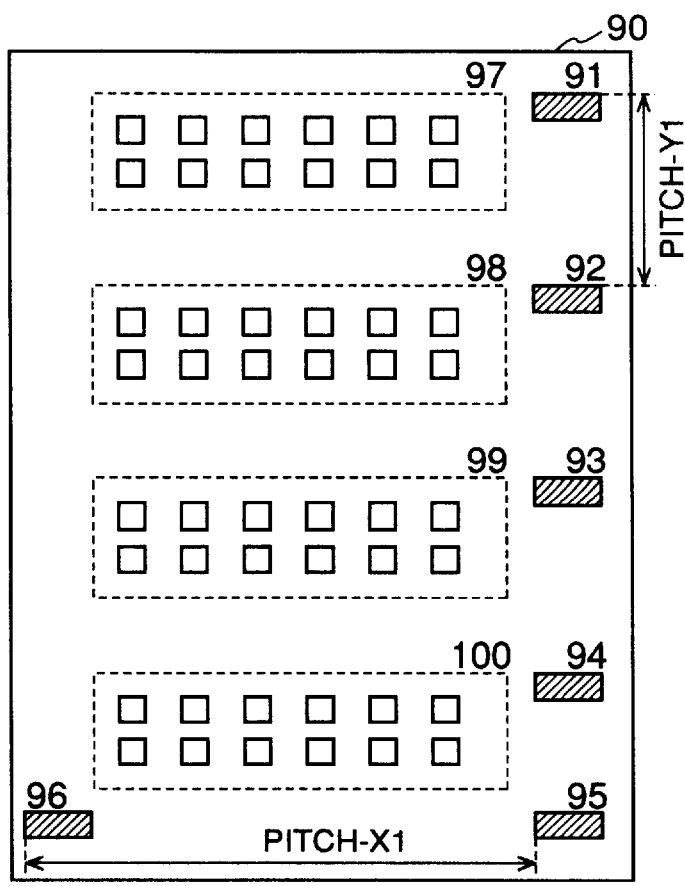
FIG. 17 is a view for explaining the reading operation of the mark sheet.

[6-1-1] At first, the position of the reference mark 91, shown in FIG. 17, is determined. Since the pattern of the marking sheet at the generation is already known, a position of about −4 to −6 mm in the Y direction (111 in FIG. 22), based on the positional design value of the reference mark 91, is given as the starting coordinate of the window area for detecting the reference mark 91 to a position determining routine for the reference mark, to be explained later in [6-2]. The routine returns the result of identification of the mark and a reference value (coordinate value of a specified position common to the reference marks, as will be explained later) to the routine [6-1].

[6-1-2] Then, the position of the reference mark 92 is determined. The starting coordinates of the window area for the determination are obtained, in the X direction, by adding W/2 to the already determined reference value of the reference mark 91, and, in the Y direction, by adding (PITCH-Y1)—$\Delta$py1 to be explained later. These values (112 in FIG. 22) are given as the starting coordinates of the window area for determining the position of the reference mark 92, to the routine [6-2] for determining the reference mark position.

Subsequently, the starting coordinates (113–115 in FIG. 22) of the window areas for determining the positions of the reference marks 93–95 are determined in succession in a similar manner, and are given to the routine [6-2].

[6-1-3] Rotational correction is used for determining the position of the reference mark 96. For a read value (XA, YA) of the reference value of the reference mark 91 and a read value (XB, YB) of the reference value of the reference mark 95, the rotational angle θ1 is given by:

$$\theta1=\tan^{-1}(XB-XA)/(YB-YA),$$

so that a rotation θ1 is executed in [6-1-3].

In the X-direction, there is executed a rotation of PITCH-X1, then the X-component thereof is subtracted from the read reference value of the reference mark 95 and W/2 is further added. In the Y-direction, there is executed a rotation of PITCH-X1, then the Y-component there is added to the read reference value of the reference mark 95 and Δpy1 is subtracted. These values (116 in FIG. 22) are given as the starting coordinates of the window area for determining the position of the reference mark 96, to the routine [6-2].

The PITCH-Y1 mentioned above is, as shown in FIG. 17, the pitch of the reference marks 91–95 in the Y-direction. The Δpy1 corresponds to H/2+PITCH-Y1/N, wherein N is a value depending on the precision of the image reading device and is selected, for example, as 2, 3, 4 or 5. The PITCH-X1 is the pitch of the reference marks 95 and 96 in the X-direction, as shown in FIG. 17.

[6-2] Routine for discriminating the reference marks and determining the positions thereof (S102, S104):

This routine discriminates each reference mark and determines the positions thereof, based on the starting coordinates of the window area 131 given by [6-1].

The details of this routine will be explained in the following items [6-2-1] to [6-2-9], which respectively correspond to those numbers in FIG. 20.

[6-2-1] At first the upper end 1 of the reference mark is located. The coordinate is increased in the Y-direction until the black data occupy ¾ of the window area 131, and a position satisfying this condition is determined as the upper end 1.

[6-2-2] Then, the coordinate is reduced in the Y-direction until the black data become ¼ or less of the window area 131, and the lower end is defined when this condition is satisfied. Then, there is discriminated whether the distance from the upper end 1 to the lower end is within a range H±Δh. This constitutes a first condition for discriminating the reference mark.

[6-2-3] Then, determined is the middle point between the upper end 1 and the lower end.

[6-2-4] Starting from the middle point determined in [6-2-3], the X-coordinate is reduced in the X-direction until the black data occupy ½ or less of the window area 131, and a left end 1 is defined when the condition is satisfied.

[6-2-5] Then, starting from said left end 1, the coordinate is increased in the X-direction until the black data occupy ½ or less of the window area 131, and a right end is defined when this condition is satisfied. Then discriminated is whether the distance from the left end 1 to the right end is within a range W±Δw. This constitutes a second condition for discriminating a reference mark.

[6-2-6] Then, the coordinate is advanced by H×sinθ1 from the left end 1, wherein θ1 is the maximum permissible rotation angle in the X-direction.

[6-2-7] The coordinate is reduced in the Y-direction from the position determined in [6-2-6], until the black data occupy ¼ or less of the window area 131, and an upper end 2 is defined when this condition is satisfied.

[6-2-8] Then, the coordinate is advanced by H/2 in the Y-direction from the upper end 2.

[6-2-9] Starting from the position determined in [6-2-8], the coordinate is reduced in the X-direction until the black data occupy ½ or less of the window area 131, and the reference value is determined when this condition is satisfied.

The Δh and Δw mentioned above depend on the precision of the image reading device and of the printing of the marking sheet, but are normally selected by the number of pixels corresponding to 0.1 to 1.0 mm on the actual image.

H×sinθ1 represents a distance which is necessary and enough for determining the upper end 2 in the step [6-2-7]. If the distance is excessively long, the position of the upper end 2 becomes significantly aberrated from the actual situation, thus generating an error in the reference value, but, if the distance is too short, a left-end edge is mistaken for as the upper end 2, whereby an error is generated in the reference value also in this case.

Based on the results of first and second discriminations in [6-2-2] and [6-2-5], there is identified whether the image data, subjected to the analysis, are of a marking sheet or an ordinary image. For this identification, there may be employed the first reference mark only, or all the reference marks.

[6-3] Determination of mark reading position (S106 in FIG. 21):

Based on the reference values of the reference marks 91–95 determined in the routine [6-2], the following four parameters are corrected and a mark reading position is given to the mark reading routine [6-4].

Figure 23:
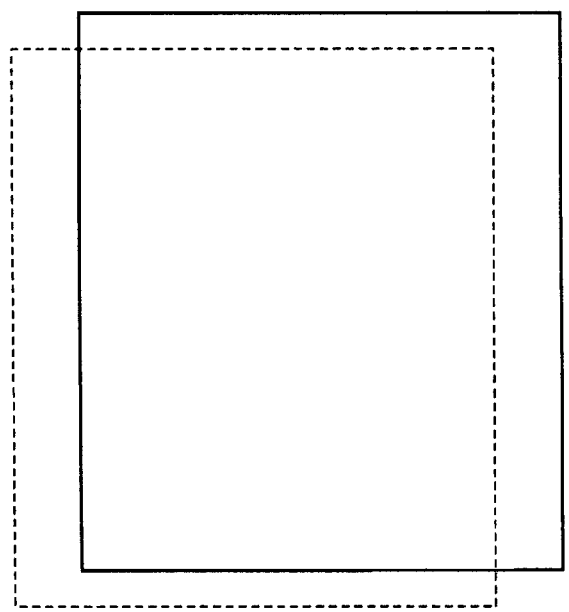
FIG. 23 is a view showing an example of positional displacement of the mark sheet.

[6-3-1] At first, in case the aberrations are present in the X- and Y-directions as shown in FIG. 23, the aberrations are corrected by the position of the reference mark 91 shown in FIG. 17.

Figure 24:
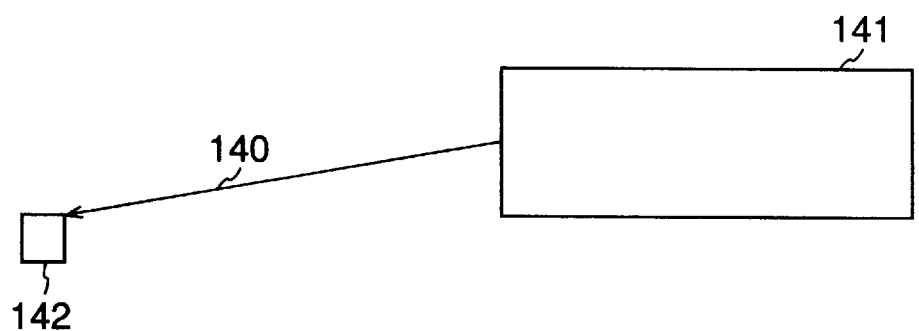
FIG. 24 is a view showing relative positional relationship between the reference mark and the read mark.

[6-3-2] The ratio of image elongation/contraction is given by P'/P, wherein P' and P are respectively the read value and the design value of the pitch of the reference values. Thus, a relative distance 140, shown in FIG. 24, from the reference value of the reference mark 141 to the mark 142 to be read, is corrected, in the Y-direction, by the Y-component of the design value multiplied by the ratio of elongation/contraction in the Y-direction.

Also, in the X-direction, the ratio of image elongation/contraction is given by Q'/Q, wherein Q' and Q are respectively the read value and the design value of the pitch of the reference values of the reference marks 95, 96. Thus, the relative distance 140 is corrected in the X-direction, by the X-component of the design value of the relative distance 140, multiplied by the ratio in the X-direction.

[6-3-3] If a rotation is present, a correction is made by a rotation of the coordinates to the relative distance 140 from the reference value to the mark 142 to be read, utilizing the rotation angle θ1 mentioned above.

[6-3-4] Also, if a distortion is present, such distortion is represented by the difference between the theoretical reference value of the reference mark 96, obtained from the designed reference values of the reference marks 95, 96 combined with the corrections for the aberrations, elongation, contraction and rotation in [6-3-1] to [6-3-3] and the actually read value. Thus, such distortion is corrected by adding such difference, as the component of distortion, to the individual relative distance.

The above-mentioned processes [6-3-1] to [6-3-4] allow to determine the mark reading position by suitable corrections even in the presence of aberration, elongation, contraction, rotation and/or distortion in the image data of the marking sheet, and the mark reading positions are given to the mark reading routine.

[6-4] Mark reading (S107 in FIG. 21):

The marks are read, based on the mark reading positions determined in [6-3].

In the present embodiment, the mark reading is executed, utilizing the reference mark for each block, represented by a broken line in FIG. 17.

Figure 25:
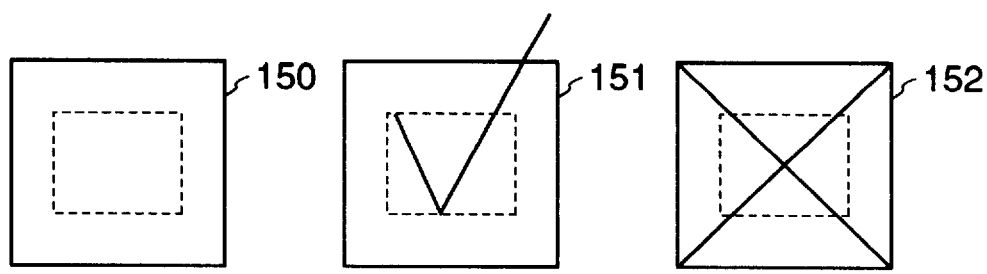
FIG. 25 is a view showing the mark reading method.

The mark reading is effected by defining an effective area in each marking frame 150–152 as shown by a broken-lined frame in FIG. 25, and counting the number of blackened dots in the effective area, and the marking is considered present if the count exceeds a certain number.

The entire internal area of the marking frame is not taken as the effective area, in order to avoid erroneous reading in the eventual presence of aberration, elongation, contraction, rotation or distortion at the reading of the image of the marking sheet.

In the following there will be explained another embodiment of the present invention.

Also, in this embodiment, the configuration of the apparatus is same as that in the foregoing embodiment. In the following there will be explained the details of the mark reading process, in the following [12-1] to [12-4].

Figure 26:
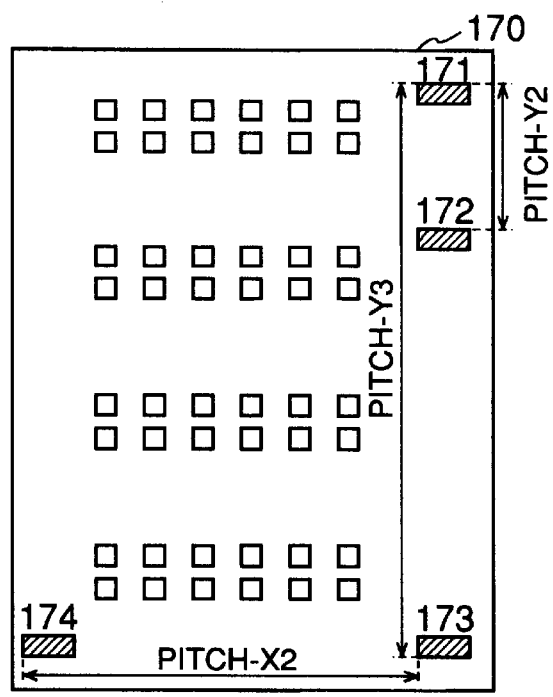
FIG. 26 is a view showing an example of the mark sheet.
Figure 27:
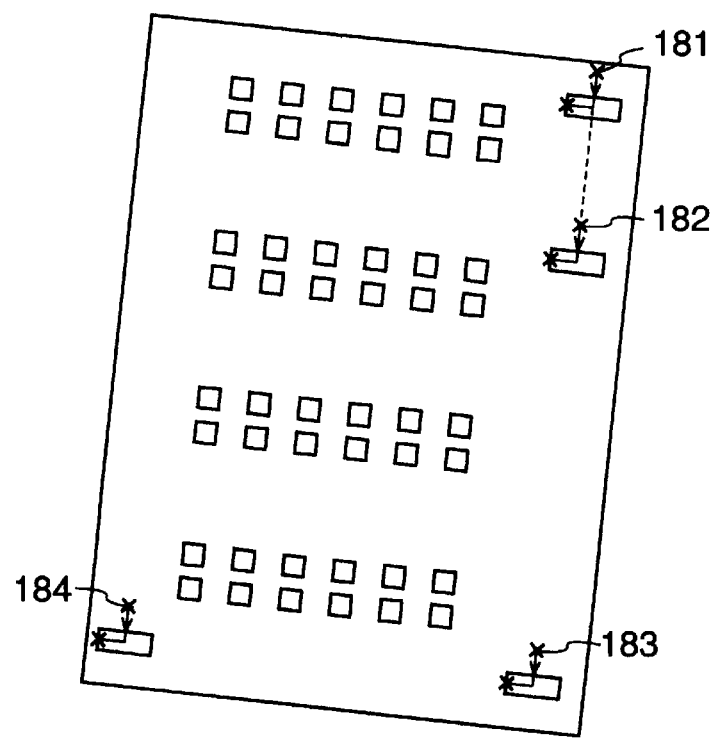
FIG. 27 is a view showing the reading sequence for the reference mark.

[12-1] Sequence of determining, in succession, the positions of the reference marks 171–174:

FIG. 26 is a schematic view of a marking sheet 170 to be employed in the present embodiment, and FIG. 27 is a view showing the outline of the process for reading the reference marks in the present embodiment.

[12-1-1] At first determined is the position of the reference mark 171 shown in FIG. 26 is determined. Since the pattern of the marking sheet at the generation is already known as in the foregoing embodiment, a position of about −4 to −6 mm in the Y-direction (181 in FIG. 27), based on the positional design value of the reference mark 171, is given as the starting coordinate of the window area for detecting the reference mark 171 to the position determining routine [12-2] for the reference mark. The routine returns the result of identification of the mark and a reference value to the routine [12-1] as will be explained later.

[12-1-2] The starting coordinates of the window area for determining the position of the reference mark 172 are obtained, in the X-direction, by adding W/2 and, in the Y-direction, by adding (PITCH-Y2)—Δpy2, to the previously determined position of the reference mark 171. These values are given, as the starting coordinates (182 in FIG. 27) of the window area 131 for determining the position of the reference mark 172, to the position determining routine [12-2] for the reference mark.

[12-1-3] Rotational correction is used for determining the position of the reference mark 173. For a read reference value (XC, YC) of the reference mark 171 and a reference value (XD, YD) of the reference mark 172, the rotational angle θ2 is given by:

$$\theta2=\tan^{-1}(XD-XC)/(XD-YC)$$

so that a rotation θ2 is executed in [12-1-3].

More specifically, in the X-direction, the X-component of a rotation of the PITCH-Y3 in the Y-direction is added to the read reference value of the reference mark 171. In the Y-direction, the Y-component of a rotation of the PITCH-Y3 in the Y-direction is added to the read reference value of the reference mark 171, and Δpy2 is then subtracted.

These values are given, as the starting coordinates (183 in FIG. 27) of the window area 131 for determining the position of the reference mark 173 shown in FIG. 26, to the position determining routine [12-3] for the reference mark.

[12-1-4] A rotational correction is employed also for determining the position of the reference mark 174. For a read reference value (XC, YC) for the reference mark 171 and a read reference value (XE, YE) for the reference mark 173, the rotational angle θ3 is given by:

$$\theta3=\tan^{-1}(XE-XC)/(YE-YC)$$

so that a rotation θ3 is executed in [12-1-4].

More specifically, in the X-direction, the PITCH-X2 in the X-direction is rotated, and the X-component thereof is subjected from the read reference value of the reference mark 173, and W/2 is further added. In the Y-direction, the Y-component of a rotation of the PITCH-X2 in the X-direction is added to the read reference value of the reference mark 173, and Δpy2 is further subtracted.

These values are given, as the starting coordinates (184 in FIG. 27) of the window area 131 for determining the position of the reference mark 174, to the position determining routine [12-2] for the reference mark.

The PITCH-Y2 mentioned above is the pitch, as shown in FIG. 26, between the reference marks 171 and 172 in the Y-direction. The Δpy2 corresponds to H/2+PITCH-Y2/N, wherein N is a value dependent on the precision of the image reading device and is selected, for example, as 2, 3, 4 or 5.

Also, the PITCH-Y3 is the pitch, as shown in FIG. 26, between the reference marks 171 and 173 in the Y-direction. The PITCH-X2 is the pitch, as shown in FIG. 26, between the reference marks 173 and 174 in the X-direction.

[12-2] Routine for discriminating the reference marks and determining the positions thereof:

This routine discriminates each reference mark and determines the positions thereof, based on the starting coordinate of the window area 131 given by [12-1]. The details of the routine will be explained in the following items [12-2-1] to [12-2-9], which respectively correspond to the routines [6-2-1] to [6-2-9] in the foregoing embodiment.

[12-2-1] At first, the upper end 1 of the reference mark is located. The coordinate is increased in the Y-direction, until the black data occupy ¾ of the window area 131, and a position satisfying this condition is determined as the upper end 1.

[12-2-2] Then the coordinate is reduced in the Y-direction, until the black data become ¼ or less of the window area 131, and the lower end is defined when this condition is satisfied. Then, there is discriminated whether the distance from the upper end 1 to the lower end is within a range H±Δh. This constitutes a first condition for discriminating the reference mark.

[12-2-3] Then determined is the middle point between the upper end 1 and the lower end.

[12-2-4] Starting from the middle point determined in [12-2-3], the X-coordinate is reduced in the X-direction until the black data occupy ½ or less of the window area 131, and a left end 1 is defined when the condition is satisfied.

[12-2-5] Then, starting from the left end 1, the coordinate is increased in the X-direction until the black data occupy ½ or less of the window area 131, and a right end is defined when this condition is satisfied. Then discriminated is whether the distance from the left end 1 to the right end is within a range W±Δw. This constitutes a second condition for discriminating a reference mark.

[12-2-6] Then, the coordinate is advanced by H×sin θ1 from the left end 1, wherein θ1 is the maximum permissible rotation angle in the X-direction.

[12-2-7] The coordinate is reduced in the Y-direction from the position determined in [12-2-6], until the black data occupy ¼ or less of the window area 131, and an upper end 2 is defined when this condition is satisfied.

[12-2-8] Then the coordinate is advanced by H/2 in the Y-direction from the upper end 2.

[12-2-9] Starting from the position determined in [12-2-8], the coordinate is reduced in the X-direction until the black data occupy ½ or less of the window area 131, and the reference value is determined when this condition is satisfied.

Based on the results of first and second discriminations in [12-2-2] and [12-2-5], there is identified whether the image data, subjected to the analysis, are of a marking sheet or an ordinary image. For this identification there may be employed the first reference mark only, or all the reference mark.

[12-3] Determination of mark reading position:

Based on the reference values of the reference marks 171–174 determined in the routine [12-2], the following four parameters are corrected and a mark reading position is given to the mark reading routine [12-4].

[12-3-1] At first, in case the aberrations are present in the X- and Y-directions as shown in FIG. 23, the aberrations are corrected by the position of the reference mark 171 shown in FIG. 26.

[12-3-2] The ratio of image elongation/contraction is given by P'/P, wherein P' and P are respectively the read value and the design value of the pitch of the reference values. Thus, a relative distance from the reference value is corrected, in the Y-direction, by the Y-component of the design value thereof, multiplied by the ratio of elongation/contraction in the Y-direction.

Also, in the X-direction, the ratio of image elongation/contraction is given by Q'/Q, wherein Q' and Q are respectively the read value and the design value of the pitch of the reference values of the reference marks 173 and 174. Thus the relative distance from the reference value is corrected by the X-component of the design value thereof, multiplied by said ratio of elongation/contraction in the X-direction.

[12-3-3] If a rotation is present, a correction is made by a rotation of the coordinates applied to the relative distance from the reference value to the reference value to be read, utilizing the rotation angle θ3 mentioned above.

[12-3-4] Also, if a distortion is present, such distortion is represented by the difference between the theoretical reference value of the reference mark 174, obtained from the designed reference values of the reference marks 173, 174 combined with the corrections for the aberrations, elongation, contraction and rotation in [12-3-1] to [12-3-3] and the actually read value. Thus, such distortion is corrected by adding such difference, as the component of distortion, to the individual relative distance.

The above-mentioned processes [12-3-1] to [12-3-4] allow to determine the mark reading position by suitable corrections even in the presence of aberration, elongation, contraction, rotation and/or distortion in the image data of the marking sheet, and the mark reading positions are given to the mark reading routine.

[12-4] Marking reading:

The marks are read, based on the mark reading positions determined in [12-3].

The mark reading is effected, as in the foregoing embodiment, by defining an effective area in each marking frame 150–152 as shown by a broken-lined frame in FIG. 25, and counting the number of blackened dots in said effective area, and the marking is considered present if said count exceeds a certain number.

As explained in the foregoing, the discriminating means for the reference mark can promptly discriminate whether the image currently stored is of ordinary image data or of a marking sheet. Also, the marking sheet can be recognized without error, by comparison of the size of the reference mark with the design value thereof.

Also, the precision of mark reading can be improved by determining the position of the reference marks, based on the reference values mentioned above.

Furthermore, high adaptability can be obtained by correcting the mark reading position in consideration of the positional aberration, elongation, contraction, rotation and/or distortion of the image.

The foregoing embodiments have been explained by examples of reading a marking sheet, but the present invention is likewise applicable to an apparatus for reading bar codes or optically readable characters. Thus the marks to be read include the bar code patterns and the character patterns in the optical character recognition.

As explained in the foregoing, exact mark reading can be achieved with a limited number of reference marks, by detecting the positional aberration, elongation, contraction, rotation and/or distortion of the image from the positional relationship of said plural reference marks and accordingly correcting the mark reading positions.

What is claimed is:

1. An image retrieving apparatus for retrieving an original image stored in a storage medium, comprising:

generating means for generating a plurality of index images for retrieving original images to be stored in the storage medium, for generating marking frames representing marking areas for selecting one or more of said plurality of index images, and for generating identification information indicative of identification of the storage medium; and printing means for printing the index images, the marking frames and the identification information on a sheet.

2. An apparatus according to claim 1, further comprising:

reading means for reading the sheet which is printed by said printing means and is marked by an operator and an original;

recognizing means for recognizing a mark of the sheet read by said reading means; and storing means for applying one or more index images selected by the mark to the original image which said reading means reads, in accordance with a recognition result of said recognizing means, and for storing the original image in said storage medium.

3. An apparatus according to claim 1, wherein said generating means is adapted to effect generation in such a manner as to arrange the index images in a matrix arrangement and to place the marking frames in proximity to the respective index images.

4. An apparatus according to claim 3, wherein said generating means generates a frame without the index image in an area where there is no index image to be placed in said matrix arrangement and does not generate the marking frame corresponding to the frame without the index image.

5. An apparatus according to claim 1, further comprising:

reading means for reading the sheet which is printed by said printing means and is marked by an operator;

recognizing means for recognizing a mark of the sheet read by said reading means; and retrieving means for retrieving an original image stored in the storage medium in accordance with a recognition result of said recognizing means.

6. An image retrieving apparatus for retrieving an original image stored in a storage medium, comprising:

generating means for generating a plurality of index images for retrieving original images to be stored in said storage medium, for generating marking frames representing marking areas for selecting one or more of said plurality of index images, and for generating identification information indicative of identification of a type of mark sheet; and printing means for printing the index images, the marking frames and the identification information on a sheet.

7. An image retrieving method for retrieving an original image stored in a storage medium, the method comprising the steps of:

generating a plurality of index images for retrieving the original images to be stored in the storage medium;

generating marking frames representing marking areas for selecting one or more of said plurality of index images;

generating identification information indicative of identification of the storage medium; and printing the index images, the marking frames and the identification information on a sheet.

8. A method according to claim 7, further comprising the steps of:

reading the sheet which is printed in said printing step and is marked by an operator;

recognizing a mark of the sheet read in said reading step; and retrieving the original image stored in the storage medium in accordance with a recognition result of said recognizing step.

9. A method according to claim 7, further comprising the steps of:

reading the sheet which is printed in said printing step and is marked by an operator and an original;

recognizing a mark of the sheet read in said reading step; and applying one or more index images selected by the mark to the original image read in said reading step, in accordance with a recognition result in said recognizing step, and storing the original image in said storage medium.

10. A method according to claim 7, wherein said generating step is adapted to effect generation in such a manner as to arrange the index images in a matrix arrangement and to place the marking frames in proximity to the respective index images.

11. A method according to claim 10, wherein said generating step generates a frame without the index image in an area where there is no index image to be placed in said matrix arrangement and does not generate the marking frame corresponding to the frame without the index image.

12. An image retrieving method for retrieving an original image stored in a storage medium, the method comprising the steps of:

generating a Plurality of index images for retrieving original images to be stored in said storage medium;

generating marking frames representing marking areas for selecting one or more of said plurality of index images;

generating identification information indicative of identification of a mark sheet; and printing the index images, the marking frames and the identification information on a sheet.

13. An image retrieving apparatus for retrieving an original image stored in a memory, comprising:

generating means for generating a plurality of index information for retrieving original images stored in said memory, for generating marking frames representing marking areas for selecting one or more of said plurality of index information, and for generating identification information indicative of identification of a set to which said index information belongs; and printing means for printing the index information, the marking frames and the identification information generated by said generating means on a sheet.

14. An apparatus according to claim 13, further comprising:

reading means for reading the sheet which is printed by said printing means and is marked by an operator;

recognizing means for recognizing a mark of the sheet read by said reading means; and retrieving means for retrieving an original image stored in the memory in accordance with a recognition result of said recognizing means.

15. (Amended) An apparatus according to claim 13, further comprising:

reading means for reading the sheet which is printed by said printing means and is marked by an operator and an original;

recognizing means for recognizing a mark of the sheet read by said reading means; and storing means for applying one or more index information selected by the mark to the original image which said reading means reads, in accordance with a recognition result of said recognizing means, and for storing the original image in said memory.

16. An apparatus according to claim 13, wherein said generating means is adapted to effect generation in such a manner as to arrange the index information in a matrix arrangement and to place the marking frames in proximity to the respective index information.

17. An apparatus according to claim 16, wherein said generating means generates a frame without the index information in an area where there is no index information to be placed in said matrix arrangement and does not generate the marking frame corresponding to the frame without the index information.

18. An image retrieving method for retrieving an original image stored in a memory, the method comprising the steps of:

generating a plurality of index information for retrieving original images stored in said memory;

generating marking frames representing marking areas for selecting one or more of said plurality of index information;

generating identification information indicative of identification of a set to which said index information belongs; and printing the index information, the marking frames and the identification information on a sheet.

19. A method according to claim 18, further comprising the steps of:

reading the sheet which is printed in said printing step and is marked by an operator;

recognizing a mark of the sheet read in said reading step; and retrieving an original image stored in the memory in accordance with a recognition result of said recognizing step.

20. A method according to claim 18, further comprising the steps of:

reading the sheet which is printed in said printing step and is marked by an operator and an original;

recognizing a mark of the sheet read in said reading step; and applying one or more index information selected by the mark to the original image read in said reading step, in accordance with a recognition result in said recognizing step, and storing the original image in said memory.

21. A method according to claim 18, wherein in said generating step, generation of the plurality of index information is performed in such a manner as to arrange the index information in a matrix arrangement and to place the marking frames in proximity to the respective index information.

22. A method according to claim 21, wherein said generating step generates a frame without the index information in an area where there is no index information to be placed in said matrix arrangement and does not generate the marking frame corresponding to the frame without the index information.

23. An image retrieving apparatus for retrieving an original image stored in a storage medium, comprising:

generating means for generating a plurality of indexes for retrieving original images to be stored in the storage medium, for generating marking frames representing marking areas for selecting one or more of said plurality of indexes, and for generating identification information indicative of identification of the storage medium; and printing means for printing the indexes, the marking frames and the identification information on a sheet.

24. An image retrieving apparatus for retrieving an original image stored in a storage medium, comprising:

generating means for generating a plurality of indexes for retrieving original images to be stored in said storage medium, for generating marking frames representing marking areas for selecting one or more of said plurality of indexes, and for generating identification information indicative of identification of a type of mark sheet; and printing means for printing the indexes, the marking frames and the identification information on a sheet.

25. An image retrieving method for retrieving an original image stored in a storage medium, the method comprising the steps of:

generating a plurality of indexes for retrieving the original images to be stored in the storage medium;

generating marking frames representing marking areas for selecting one or more of said plurality of indexes;

generating identification information indicative of identification of the storage medium; and printing the indexes, the marking frames and the identification information on a sheet.

26. An image retrieving method for retrieving an original image stored in a storage medium, the method comprising the steps of:

generating a plurality of indexes for retrieving original images to be stored in said storage medium;

generating marking frames representing marking areas for selecting one or more of said plurality of indexes;

generating identification information indicative of identification of a mark sheet; and printing the indexes, the marking frames and the identification information on a sheet.

* * * * *

UNITED STATES PATENT AND TRADEMARK OFFICE
CERTIFICATE OF CORRECTION

PATENT NO.    : 5,881,214
DATED         : March 9, 1999
INVENTOR(S)   : Akira Morisawa et al.

It is certified that error appears in the above-identified patent and that said Letters Patent is hereby corrected as shown below:

Column 11,
Line 48, "these" should read -- such --.

Column 14,
Line 15, "as" should be deleted.

Column 15,
Line 29, "determined is" should be deleted.

Column 19,
Line 52, "Plurality" should read -- plurality --.

Column 20,
Line 15, "(Amended)" should be deleted.

Signed and Sealed this

Fifteenth Day of July, 2003

JAMES E. ROGAN
*Director of the United States Patent and Trademark Office*